US012749595B2

(12) United States Patent
Nagano et al.

(10) Patent No.: US 12,749,595 B2
(45) Date of Patent: Sep. 29, 2026

(54) WIRE HARNESS

(71) Applicant: SUMITOMO WIRING SYSTEMS, LTD., Yokkaichi (JP)

(72) Inventors: Shunsuke Nagano, Yokkaichi (JP); Ryo Kuroishi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 210 days.

(21) Appl. No.: 18/848,349

(22) PCT Filed: Mar. 23, 2023

(86) PCT No.: PCT/JP2023/011353
§ 371 (c)(1),
(2) Date: Sep. 18, 2024

(87) PCT Pub. No.: WO2023/189984
PCT Pub. Date: Oct. 5, 2023

(65) Prior Publication Data

US 2025/0239382 A1 Jul. 24, 2025

(30) Foreign Application Priority Data

Mar. 29, 2022 (JP) ................................. 2022-053367

(51) Int. Cl.
*H01B 7/18* (2006.01)
*B60R 16/02* (2006.01)
*H01B 7/00* (2006.01)

(52) U.S. Cl.
CPC ....... *H01B 7/1805* (2013.01); *B60R 16/0215* (2013.01); *H01B 7/0045* (2013.01)

(58) Field of Classification Search
CPC ................ H01B 7/1805; H01B 7/0045; B60R 16/0215; H02G 15/18; H05K 9/00
See application file for complete search history.

(56) References Cited

U.S. PATENT DOCUMENTS

2001/0053633 A1 12/2001 Konda
2013/0248246 A1* 9/2013 Oga ..................... H02G 3/0462 174/72 A (Continued)

FOREIGN PATENT DOCUMENTS

JP S50-040719 B1 12/1975
JP S61-76005 A 4/1986

(Continued)

OTHER PUBLICATIONS

Jun. 13, 2023 International Search Report issued in International Patent Application No. PCT/JP2023/011353.

*Primary Examiner* — Sherman Ng
(74) *Attorney, Agent, or Firm* — Oliff PLC

(57) ABSTRACT

A wire harness including a plurality of electrical wire members that each include a first shielded electrical wire having a cylindrical first individual shield and a conductive member electrically connected to the first shielded electrical wire; a cylinder that surrounds an outer periphery of the conductive members and has electrical conductivity; and a cylindrical first shield that surrounds outer peripheries of portions of the plurality of electrical wire members exposed from the first individual shields and the cylinder and has electrical conductivity.

10 Claims, 9 Drawing Sheets

(56) References Cited

U.S. PATENT DOCUMENTS

| | | | |
|---|---|---|---|
| 2016/0071630 | A1 | 3/2016 | Sugino |
| 2021/0226348 | A1 | 7/2021 | Kuroishi |

FOREIGN PATENT DOCUMENTS

| | | | |
|---|---|---|---|
| JP | 2004-296418 | A | 10/2004 |
| JP | 2016-186922 | A | 10/2016 |
| JP | 2021-106210 | A | 7/2021 |
| WO | 2019/188100 | A1 | 10/2019 |

* cited by examiner

WIRE HARNESS

BACKGROUND

The present disclosure relates to a wire harness.

There have been conventionally known wire harnesses arranged inside a vehicle such as a hybrid vehicle or an electric vehicle that include shielded electrical wires (refer to JP 2004-296418A, for example). The shielded electrical wire includes a conductive core wire, an insulating coating that surrounds the outer periphery of the core wire, a braided wire that surrounds the outer periphery of the insulating coating, and a sheath that surrounds the outer periphery of the braided wire. The braided wire has an electromagnetic shielding function that suppresses the radiation of electromagnetic waves (electromagnetic noise) from the core wire to the outside of the shielded electrical wire.

SUMMARY

However, in the above-described wire harness, it is desired to suppress the deterioration of electromagnetic shielding performance, and there is still room for improvement in this respect.

An exemplary aspect of the disclosure provides a wire harness that is capable of suppressing the deterioration of electromagnetic shielding performance.

A wire harness according to the present disclosure includes a cylindrical first shield that surrounds outer peripheries of portions of the plurality of electrical wire members exposed from the first individual shields and the cylinder and has electrical conductivity, wherein: each of a plurality of the first shielded electrical wires included in the plurality of electrical wire members includes a first core wire that has electrical conductivity, a first insulating coating that surrounds an outer periphery of the first core wire and has electrical insulation, the first individual shield that surrounds an outer periphery of the first insulating coating and has electrical conductivity, and a first sheath that surrounds an outer periphery of the first individual shield and has electrical insulation, an end of the first individual shield has a first exposed portion that is exposed from an end of the first sheath, and the first shield is electrically connected to the first individual shield in a state of contact with a plurality of the first exposed portions included in the plurality of electrical wire members and is also electrically connected to the cylinder.

The wire harness according to the present disclosure has an effect of suppressing the deterioration of electromagnetic shielding performance.

DETAILED DESCRIPTION OF EMBODIMENTS

Description of Embodiments of Present Disclosure

Figure 1:
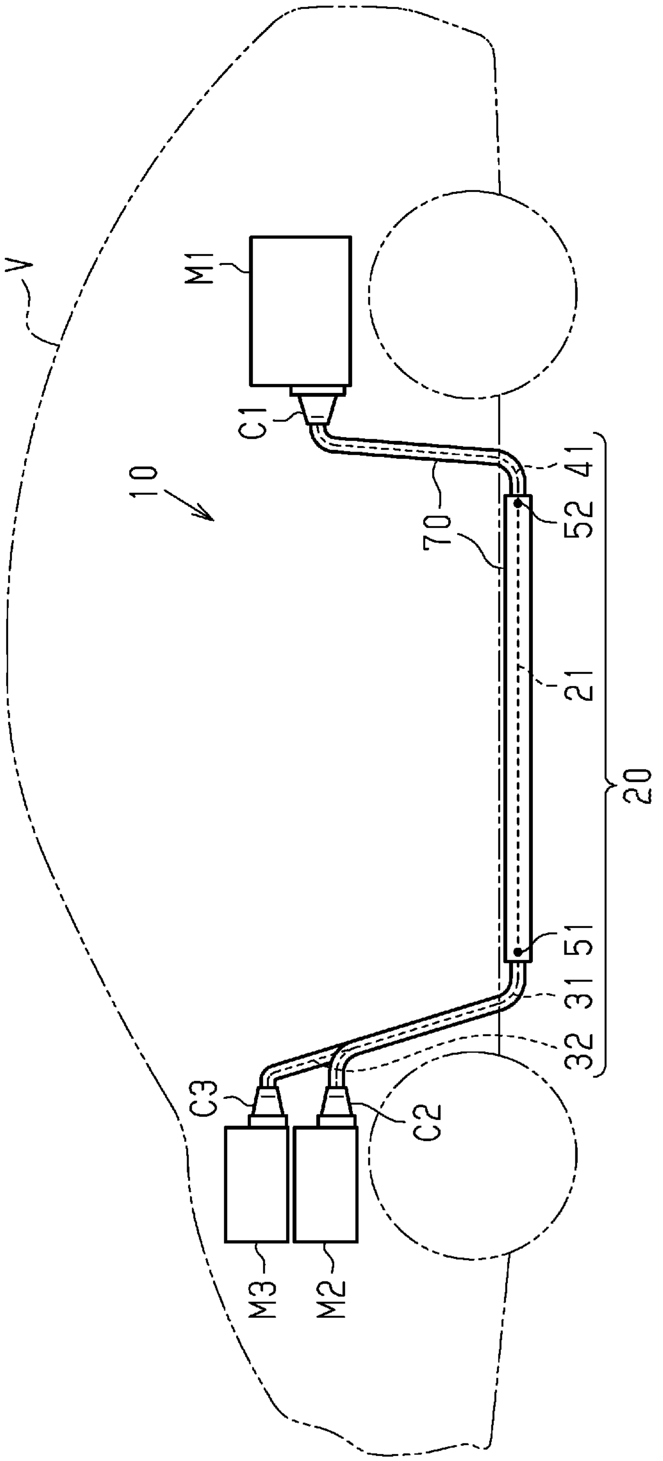
FIG. 1 is a schematic configuration diagram showing a wire harness according to an embodiment.

First, embodiments of the present disclosure will be listed and described.

[1] A wire harness according to the present disclosure includes a plurality of electrical wire members that each include a first shielded electrical wire having a cylindrical first individual shielding member and a conductive member electrically connected to the first shielded electrical wire, a cylindrical member that surrounds an outer periphery of the conductive member and has electrical conductivity, and a cylindrical first shielding member that surrounds outer peripheries of portions of the plurality of electrical wire members exposed from the first individual shielding members and the cylindrical member and has electrical conductivity, wherein each of a plurality of the first shielded electrical wires included in the plurality of electrical wire members includes a first core wire that has electrical conductivity, a first insulating coating that surrounds an outer periphery of the first core wire and has electrical insulation, the first individual shielding member that surrounds an outer periphery of the first insulating coating and has electrical conductivity, and a first sheath that surrounds an outer periphery of the first individual shielding member and has electrical insulation, an end of the first individual shielding member has a first exposed portion that is exposed from an end of the first sheath, and the first shielding member is electrically connected to the first individual shielding member in a state of contact with a plurality of the first exposed portions included in the plurality of electrical wire members and is also electrically connected to the cylindrical member.

According to this configuration, the first shielding member is electrically connected to the first individual shielding member in a state of contact with the plurality of first exposed portions, and is also electrically connected to the cylindrical member. Accordingly, the first individual shielding member and the cylindrical member can be electrically connected via the first shielding member. Therefore, the electrical wire members can be suitably electromagnetically shielded by the first shielding member, the first individual shielding member, and the cylindrical member. The first shielding member is provided so as to surround the outer periphery of the portions of the plurality of electrical wire members that are exposed from the first individual shielding member and the cylindrical member. Therefore, even if the electrical wire members have portions that are exposed from the first individual shielding members and the cylindrical member, the exposed portions can be surrounded by the first shielding member that is different from the first individual shielding members and the cylindrical member. Accordingly, the exposed portions of the electrical wire members can be suitably electromagnetically shielded by the first shielding member. Therefore, even if the electrical wire members have portions that are exposed from the first individual shielding members and the cylindrical member, it is possible to suitably suppress deterioration of electromagnetic shielding performance at the exposed portions.

This makes it possible to suitably suppress electromagnetic waves (electromagnetic noise) generated at the exposed portions from being radiated to the outside of the wire harness.

[2] The first shielding member is preferably provided so as to span across the plurality of first exposed portions and the cylindrical member in a length direction of the electrical wire members, a first end of the first shielding member in an axial direction preferably collectively surrounds outer peripheries of the plurality of first exposed portions and is fixed to outer peripheries of the plurality of first shielded electrical wires in a state of contact with the plurality of first exposed portions, and a second end of the first shielding member in the axial direction preferably surrounds an entire outer periphery of the cylindrical member in a circumferential direction and is fixed to the outer periphery of the cylindrical member in a state of contact with the outer periphery of the cylindrical member. According to this configuration, the first shielding member is formed so as to span across the plurality of first exposed portions and the cylindrical member.

Furthermore, the first shielding member is formed so as to collectively surround the outer peripheries of the plurality of first exposed portions, and is formed so as to surround the entire outer periphery of the cylindrical member in the circumferential direction. Therefore, the outer peripheries of the plurality of first shielded electrical wires provided between the first exposed portions and the cylindrical member can be surrounded by one first shielding member, and the plurality of first shielded electrical wires can be suitably electromagnetically shielded by the first shielding member.

[3] Each of the plurality of first exposed portions is preferably structured so as to be folded back toward an end of the first sheath and surrounds an outer periphery of the end of the first sheath. According to this configuration, the first exposed portion folded back to surround the outer periphery of the end of the first sheath and the first shielding member can be electrically connected to each other in a state where the first exposed portions and the first shielding member are in contact with each other.

[4] The wire harness preferably further includes an underlay member that is provided between the outer periphery of the end of the first sheath and the first exposed portions and a coupling member that couples the plurality of first exposed portions and the first shielding member, the underlay member is preferably a metallic ring member that is attached to each of the plurality of first shielded wires, and the coupling member preferably electrically connects the plurality of first exposed portions and the first shielding member in a state where the plurality of first exposed portions and the first shielding member are sandwiched between the underlay member and the coupling member. According to this configuration, the underlay member, which is a metallic ring member, is interposed between the first sheath and the first exposed portion. The plurality of first exposed portions and the first shielding member are sandwiched between the underlay member and the coupling member. Accordingly, when the coupling member is fastened to the plurality of first exposed portions, the underlay member is interposed between the first exposed portions and the first sheath, so that deformation of the shielding electrical wires can be suppressed. This improves the stability of the electrical connection between the first exposed portions and the first shielding member. Furthermore, since the underlay member is attached to each of the plurality of first shielded electrical wires, deformation of the plurality of first shielded electrical wires can be suitably suppressed.

[5] It is preferable that a connection part between the plurality of first exposed portions and the first shielding member has a structure in which the plurality of first exposed portions are bundled so as to be in contact with each other and each of the plurality of first exposed portions is in contact with the first shielding member. According to this configuration, each of the plurality of first exposed portions is in direct contact with the first shielding member, thereby improving the stability of the electrical connection between the plurality of first exposed portions and the first shielding member.

[6] The plurality of first shielded electrical wires are preferably three or more first shielded electrical wires, and the three or more first shielded electrical wires are preferably arranged along a first direction that intersects with the length direction of the electrical wire members and a second direction that intersects with the length direction of the electrical wire members and intersects with the first direction. According to this configuration, the three or more first shielded electrical wires are arranged side by side along the first direction and the second direction. Therefore, it is possible to suitably suppress upsizing of the first shielded electrical wires in the first direction, as compared to a case where three or more first shielded electrical wires are arranged side by side along only the first direction, for example.

[7] The first individual shielding member is preferably provided outside of the cylindrical member in the length direction of the electrical wire members. According to this configuration, it is possible to eliminate an area where the first individual shielding member and the cylindrical member overlap, that is, an area that is excessively electromagnetically shielded by the two shielding members, that is, the first individual shielding member and the cylindrical member.

Accordingly, it is possible to suppress the first individual shielding member from being formed longer than necessary and to reduce wasted portions of the first individual shielding member, as compared to a case where the first individual shielding member is formed so as to extend into the cylindrical member, for example.

[8] It is preferable that the conductive member is a single-core wire made of a single conductor, the single-core wire is stored in the cylindrical member, and the first core wire of the first shielded electrical wire and the single-core wire are electrically connected in the cylindrical member. According to this configuration, the single-core wire and the connection part between the single-core wire and the first core wire are stored in the cylindrical member. Therefore, the single-core wire and the electrical wire member at the connection part can be suitably electromagnetically shielded by the cylindrical member. In addition, the single-core wire and the connection part can be suitably protected by the cylindrical member.

[9] Each of the plurality of electrical wire members includes one of the single-core wires, the first shielded electrical wire electrically connected to one end of the one single-core wire in the length direction and a second shielded electrical wire electrically connected to the other end of the one single-core wire in the length direction, each of a plurality of the second shielded electrical wires included in the plurality of electrical wire members includes a second core wire that has electrical conductivity, a second insulating coating that surrounds an outer periphery of the second core wire and has electrical insulation, a second individual shielding member that surrounds an outer periphery of the second insulating coating and has electrical conductivity, and a second sheath that surrounds an outer periphery of the second individual shielding member and has electrical insulation, and the wire harness further includes a cylindrical second shielding member that surrounds an outer periphery of portions of the plurality of electrical wire members that are exposed from the second individual shielding member and the cylindrical member and has electrical conductivity, an end of the second individual shielding member preferably has a second exposed portion that is exposed from an end of the second sheath, and the second shielding member is preferably electrically connected to the second individual shielding member in a state of contact with a plurality of the second exposed portions included in the plurality of electrical wire members, and is preferably electrically connected to the cylindrical member. According to this configuration, the second shielding member is electrically connected to the second individual shielding member in a state of contact with the plurality of second exposed portions, and is also electrically connected to the cylindrical member. Accordingly, the second individual shielding member and the cylindrical member can be electrically connected via the second shielding member. Therefore, the electrical wire member can be suitably electromagnetically shielded by the second shielding member, the second individual shielding member, and the cylindrical member. The second shielding member is provided so as to surround the outer peripheries of the portions of the plurality of electrical wire members that are exposed from the second individual shielding member and the cylindrical member. Therefore, even if the electrical wire members have portions that are exposed from the second individual shielding members and the cylindrical member, the exposed portions can be surrounded by the second shielding member that is different from the second individual shielding members and the cylindrical member. Thus, the electrical wires member in the exposed portions can be suitably electromagnetically shielded by the second shielding member. Therefore, even if the electrical wire members have portions that are exposed from the second individual shielding members and the cylindrical member, it is possible to suitably suppress deterioration of electromagnetic shielding performance at the exposed portions. This makes it possible to suitably suppress electromagnetic waves generated at the exposed portions from being radiated to the outside of the wire harness.

Each of the plurality of electrical wire members preferably includes one of the single-core wires and two or more of the first shielded electrical wires electrically connected to one end of the one single-core wire in the length direction. According to this configuration, two or more first shielded electrical wires are electrically connected to one end of the single-core wire. This makes it possible to distribute power having been supplied to the single-core wire, to the two or more first shielded electrical wires, for example.

DETAILS OF EMBODIMENTS OF PRESENT DISCLOSURE

Specific examples of a wire harness according to the present disclosure will be described below with reference to the drawings. In the drawings, for convenience of description, some of components may be exaggerated or simplified. In addition, the dimensional ratio of each part may differ among the drawings. The terms "parallel" and "orthogonal" herein do not only mean strictly parallel or orthogonal, but also mean approximately parallel or orthogonal within the scope of the operation and effect of the present embodiment. The term "face each other" herein refers to surfaces or members being in front of each other, which includes not only a case where each is completely in front of the other, but also a case where each is partially in front of the other. Furthermore, the term "face each other" means both a case where a member other than two parts is interposed between the two parts, and a case where nothing is interposed between the two parts. The term "cylindrical" herein means not only a case where a peripheral wall is formed continuously around the entire circumference, but also a case where a plurality of parts are combined to form a cylindrical shape, and a case where a part of the circumference is cut out, such as a C-shape. In addition, the "cylindrical" shape includes a circle, an ellipse, and a polygon having sharp or rounded corners. It should be noted that the present disclosure is not limited to these examples herein, but rather is indicated by the scope of claims, and is intended to include all modifications within a meaning and scope equivalent to the scope of claims.

(Overall Configuration of Wire Harness 10)

A wire harness 10 shown in FIG. 1 is mounted on a vehicle V such as a hybrid vehicle or an electric vehicle, for example. The wire harness 10 electrically connects two or more vehicle-mounted devices, for example. The vehicle-mounted devices are electrical devices mounted on the vehicle V. The wire harness 10 of the present embodiment electrically connects a high voltage battery M1 and a plurality of vehicle-mounted devices M2 and M3. The wire harness 10 is formed in an elongated shape so as to extend in the front-back direction of the vehicle V, for example.

The battery M1 is provided close to the rear of the vehicle V, for example. An example of the vehicle-mounted device M2 is an inverter that is provided in front of the battery M1 in the vehicle V. The battery M1 is a high-voltage battery that is capable of supplying a voltage of 100 volts or more, for example. The vehicle-mounted device M2 as an inverter is connected to a motor (not shown) for wheel driving that serves as a power source for driving the vehicle, for example. The inverter generates AC power from DC power from the battery M1 and supplies the AC power to the motor. The vehicle-mounted device M3 is an electrical device such as an air conditioner or a DC/DC converter, for example.

The vehicle-mounted device M3 is supplied with DC power from the battery M1. In this manner, in the wire harness 10, DC power is supplied and distributed from the battery M1 to the plurality of vehicle-mounted devices M2 and M3. The vehicle-mounted devices M2 and M3 are provided in a vehicle interior such as an engine room, for example.

In the present embodiment, for the sake of convenience, the side of the wire harness 10 that is closer to the battery M1 in the length direction will be called the rear side, and the side of the wire harness 10 that is closer to the vehicle-mounted devices M2 and M3 in the length direction will be called the front side. In addition, the end of each member located closer to the battery M1 will be called the rear end, and the end of each member located closer to the vehicle-mounted devices M2 and M3 will be called the front end.

The wire harness 10 includes one or more electrical wire members 20 that electrically connect the battery M1 and the two vehicle-mounted devices M2 and M3, and an exterior member 70 that surrounds the outer periphery of the electrical wire members 20. The wire harness 10 of the present embodiment includes two electrical wire members 20.

Figure 2:
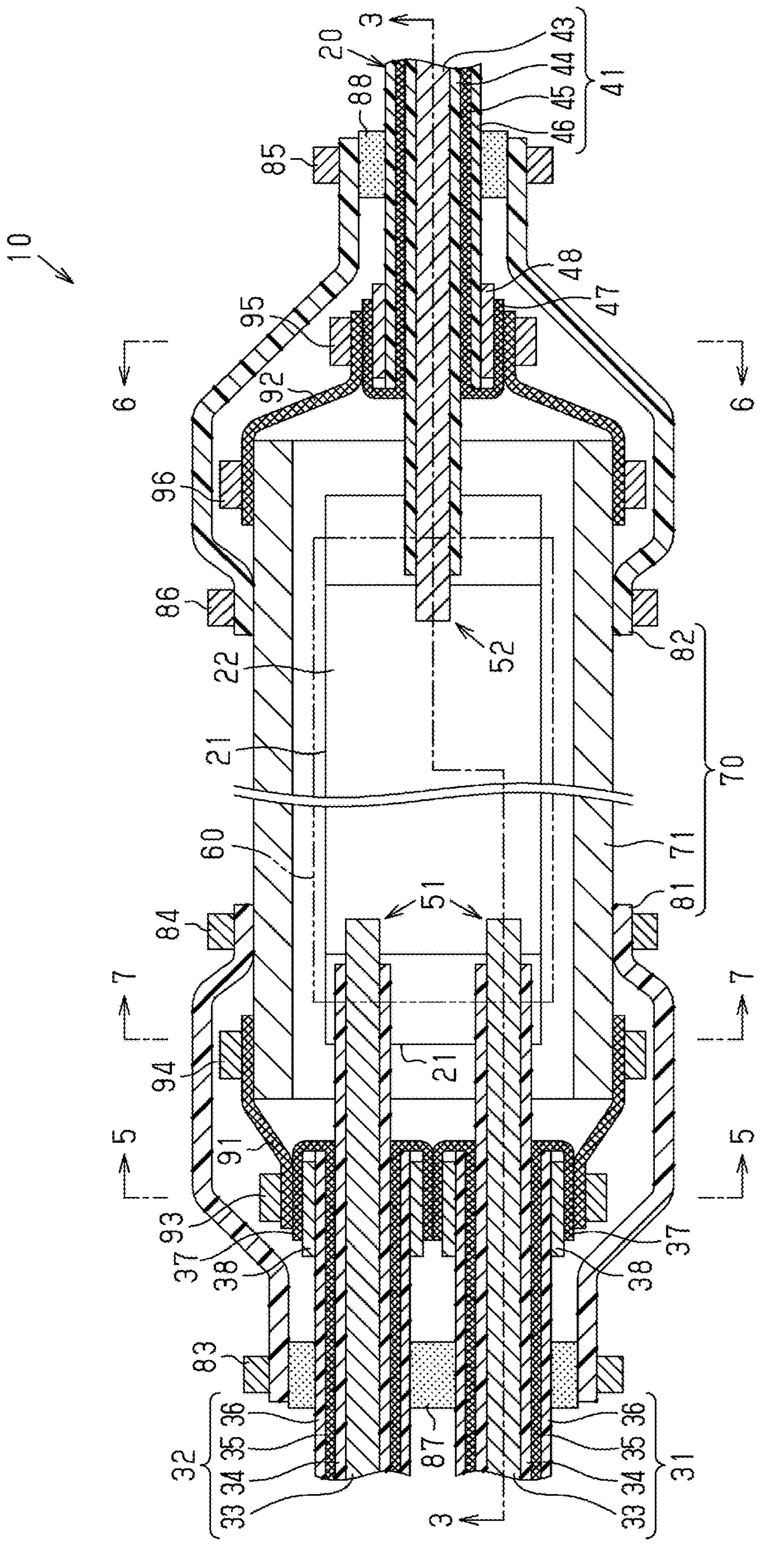
FIG. 2 is a schematic cross-sectional view of the wire harness according to the embodiment.

As shown in FIG. 2, each electrical wire member 20 has one single-core wire 21. The single-core wire 21 has a front end that is one end of the single-core wire 21 in the length direction, and a rear end that is the other end of the single-core wire 21 in the length direction. Each electrical wire member 20 has two or more electrical wires 31 and 32 (two in the present embodiment) that are connected to the front end of the single-core wire 21 and one electrical wire 41 that is connected to the rear end of the single-core wire 21. Each electrical wire member 20 has a first connection part 51 at which the single-core wire 21 and the plurality of electrical wires 31 and 32 are connected, a second connection part 52 at which the single-core wire 21 and the electrical wire 41 are connected, and a coating member 60. Each electrical wire member 20 is formed by electrically connecting the different types of electrical wires 31 and 32, single-core wire 21, and electrical wire 41 in the length direction of the electrical wire member 20. The exterior member 70 has a cylindrical member 71 (cylinder) that surrounds the outer periphery of the single-core wire 21, a waterproof member 81, and a waterproof member 82, for example.

As shown in FIG. 1, the wire harness 10 has a connector C1 that is attached to the rear end of the electrical wire 41, a connector C2 that is attached to the front end of the electrical wire 31, and a connector C3 that is attached to the front end of the electrical wire 32, for example. The rear end of the electrical wire 41 is electrically connected to the battery M1 via the connector C1, and the front end of the electrical wire 41 is electrically connected to the rear end of the single-core wire 21. The front end of the electrical wire 31 is electrically connected to the vehicle-mounted device M2 via the connector C2, and the rear end of the electrical wire 31 is electrically connected to the front end of the single-core wire 21. Accordingly, the battery M1 and the vehicle-mounted device M2 are electrically connected through the connector C1, the electrical wire 41, the single-core wire 21, the electrical wire 31, and the connector C2. The front end of the electrical wire 32 is electrically connected to the vehicle-mounted device M3 via the connector C3, and the rear end of the electrical wire 32 is electrically connected to the front end of the single-core wire 21. Accordingly, the battery M1 and the vehicle-mounted device M3 are electrically connected through the connector C1, the electrical wire 41, the single-core wire 21, the electrical wire 32, and the connector C3.

In the wire harness 10, the two or more electrical wires 31 and 32 are branched from the electrical wire 41 and single-the core wire 21 at a middle portion in the length direction of the electrical wire member 20. In the wire harness 10 of the present embodiment, the DC power supplied from the battery M1 is distributed to the plurality of electrical wires 31 and 32, and is supplied to the vehicle-mounted devices M2 and M3 through the electrical wires 31 and 32. In the wire harness 10, for example, the single-core wire 21 and the electrical wire 41 function as a trunk electrical wire, and the electrical wires 31 and 32 function as branch electrical wires. The electrical wires 31, 32, and 41 are high voltage electrical wires that are capable of handling high voltage and large current, for example.

(Configuration of Single-Core Wire 21)

Figure 3:
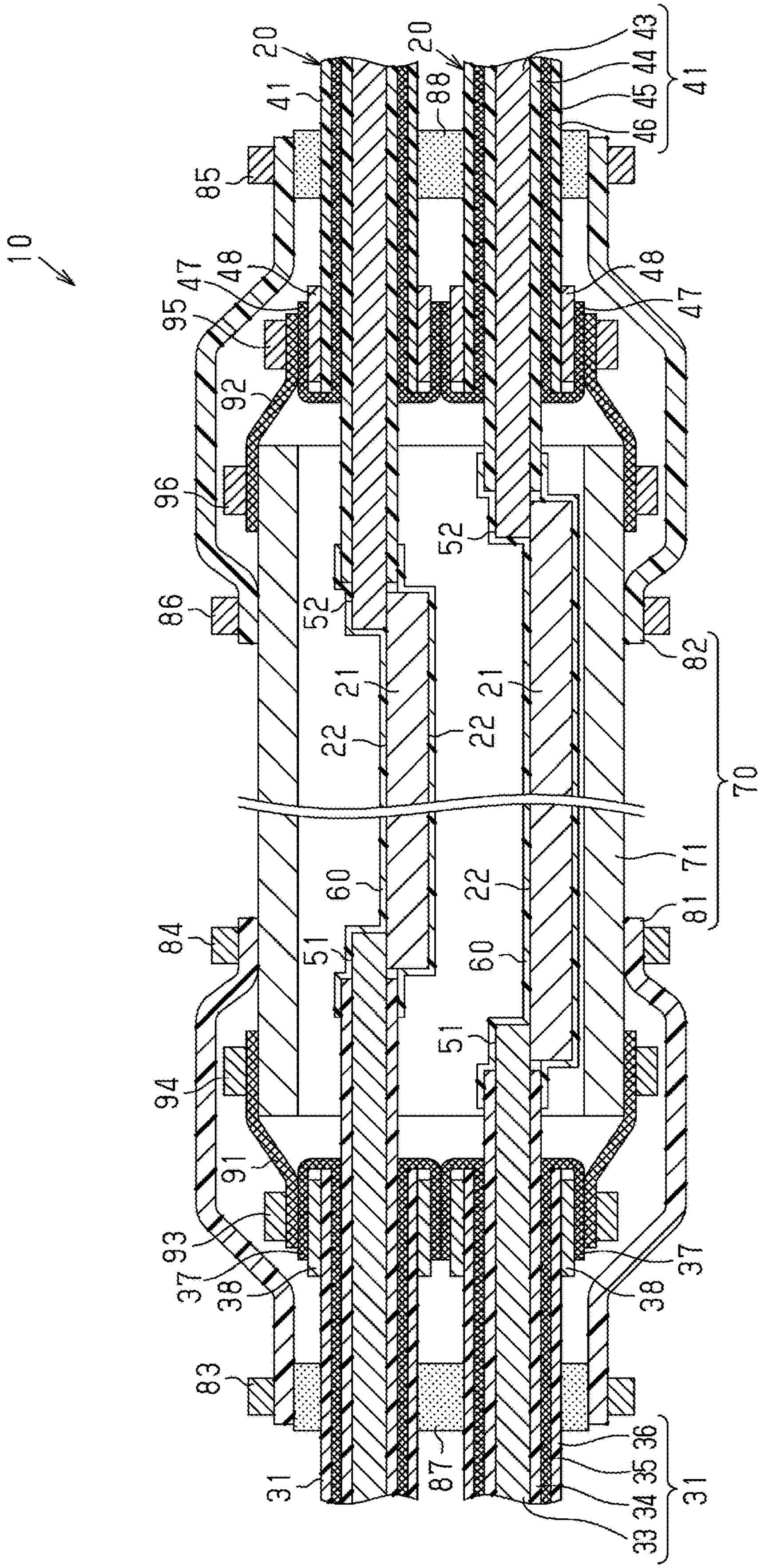
FIG. 3 is a schematic cross-sectional view of the wire harness according to the embodiment (cross-sectional view taken along line 3-3 in FIG. 2).

As shown in FIGS. 2 and 3, the single-core wire 21 is provided at the middle portion of the electrical wire member 20 in the length direction. The single-core wire 21 is formed to be higher in bending rigidity than the electrical wire 41, for example. The single-core wire 21 is formed to be higher in bending rigidity than the electrical wires 31 and 32, for example. The single-core wire 21 has a rigidity with which to be capable of maintaining a shape along the wiring path of the wire harness 10, for example. For example, when being mounted on the vehicle V, the single-core wire 21 has a rigidity sufficient to prevent the single-core wire 21 from being released from a linear or bent state due to vibration of the vehicle V or the like. The material of the single-core wire 21 can be a copper-based or aluminum-based metal material, for example.

The single-core wire 21 is made of a single conductor. The single-core wire 21 can be a columnar conductor that is made of a single metal rod having a solid structure inside, a cylindrical conductor having a hollow structure inside, or the like, for example. The single-core wire 21 of the present embodiment is a flat columnar conductor that is made of a single metal rod having a solid structure inside in a rectangular column shape (for example, a rectangular parallelepiped shape). The single-core wire 21 is formed in an elongated shape so as to extend in the front-rear direction of the vehicle V.

Figure 4:
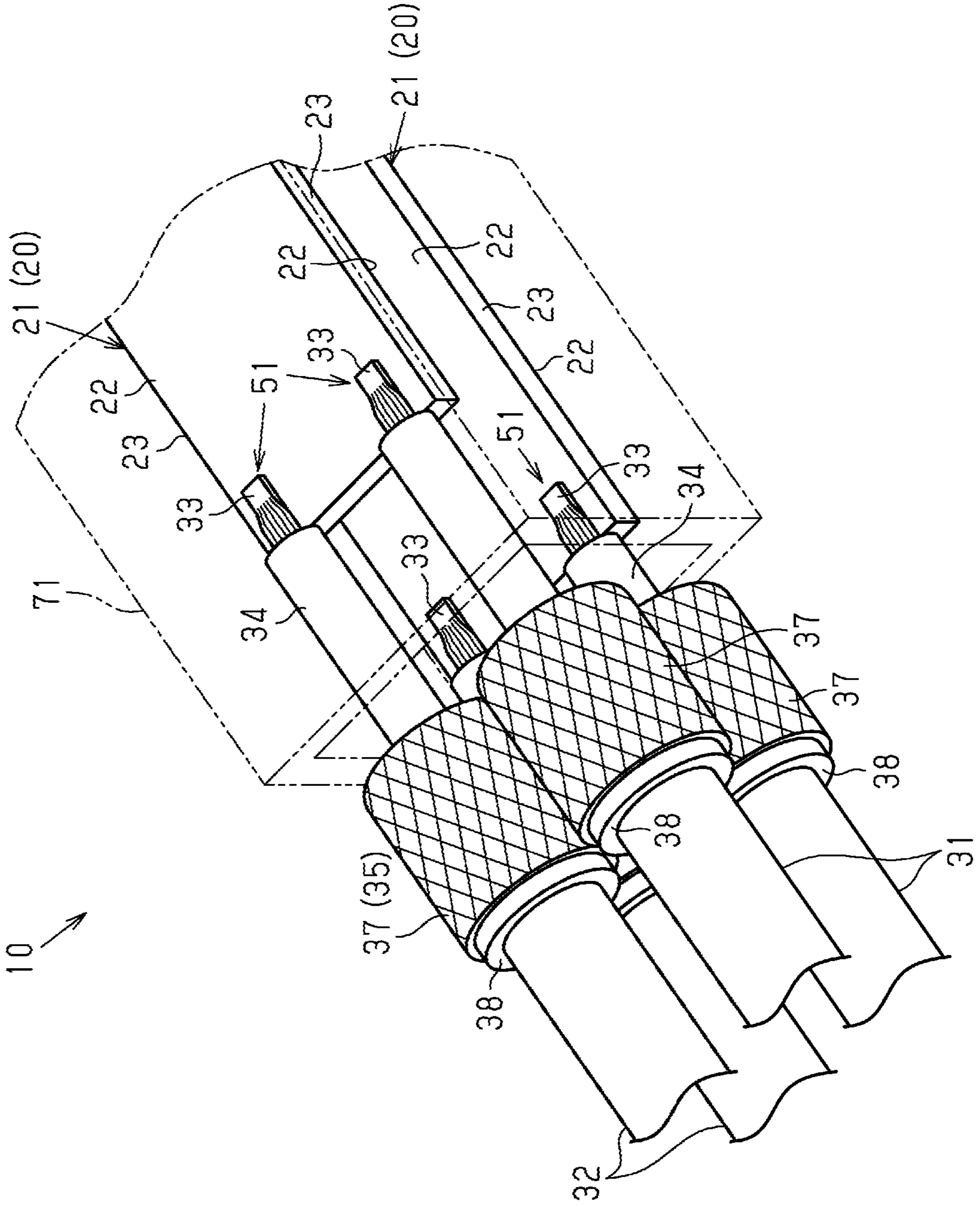
FIG. 4 is a schematic perspective view of the wire harness according to the embodiment.

As shown in FIG. 4, the single-core wire 21 of the present embodiment is formed in a flat-plate shape. The single-core wire 21 is a flat plate-shaped member that is formed so as to extend in the length direction (axial direction) and in the width direction perpendicular to the length direction, and have a predetermined thickness in the thickness direction perpendicular to the length direction and the width direction. The cross-sectional shape of the single-core wire 21 taken along a plane perpendicular to the length direction of the single-core wire 21, that is, the transverse cross-sectional shape of the single-core wire 21, is formed in a flat shape, for example. The term "flat shape" herein includes a rectangular shape and an oval shape, for example. The term "rectangular shape" herein refers to a shape that has long sides and short sides, and does not include a square shape. The term "rectangular shape" herein also includes a shape with chamfered edges and a shape with rounded edges. FIG. 4 illustrates only some members of the wire harness 10.

The transverse cross-sectional shape of the single-core wire 21 in the present embodiment is formed in a rectangular shape. The transverse cross-sectional shape of the single-core wire 21 is formed in a uniform rectangular shape over the entire length of the single-core wire 21 in the length direction, for example. The single-core wire 21 has four end faces, namely, a pair of long side surfaces 22 including the long sides of the rectangle, and a pair of short side surfaces 23 including the short sides of the rectangle. The pair of long side surfaces 22 and the pair of short side surfaces 23 are formed so as to extend over the entire length of the single-core wire 21 in the length direction. Each long side surface 22 is larger in surface area per unit length of the single-core wire 21 than each short side surface 23.

As shown in FIG. 3, the plurality of single-core wires 21 included in the plurality of electrical wire members 20 are arranged side by side in a direction intersecting the length direction of the electrical wire members 20. The plurality of single-core wires 21 are arranged side by side in a direction perpendicular to the length direction of the electrical wire members 20 (the up-down direction in the drawing), for example. The plurality of single-core wires 21 are arranged side by side such that their long side surfaces 22 face each other, for example. The long side surface 22 of one single-core wire 21 and the long side surface 22 of the other single-core wire 21 are arranged so as to face each other. The long side surface 22 of one single-core wire 21 and the long side surface 22 of the other single-core wire 21 are arranged so as to extend parallel to each other, for example.

(Configuration of Electrical Wires 31 and 32)

The electrical wires 31 and 32 shown in FIG. 2 are greater in pliability than the single-core wires 21, for example. The electrical wires 31 and 32 are greater in flexibility than the single-core wires 21, for example. The electrical wires 31 and 32 are greater in bendability than the single-core wires 21, for example.

Each of the electrical wires 31 and 32 has a first core wire 33 that is made of a plurality of elemental metal wires, and a first insulating coating 34 that surrounds the outer periphery of the first core wire 33 and has electrical insulation. Each of the electrical wires 31 and 32 has a cylindrical first individual shielding member 35 (first individual shields) that surrounds the outer periphery of the first insulating coating 34 and has electrical conductivity, and a first sheath 36 that surrounds the outer periphery of the first individual shielding member 35 and has electrical insulation, for example. Each of the electrical wires 31 and 32 in the present embodiment is a shielded electrical wire that has an electromagnetic shielding structure itself.

The first core wire 33 can be a stranded wire formed by twisting together a plurality of metal element wires or a braided wire in which a plurality of metal element wires are woven into a cylindrical shape, for example. In the present embodiment, the first core wire 33 is a stranded wire. The material of the first core wire 33 can be a copper-based or aluminum-based metal material, for example.

Figure 5:
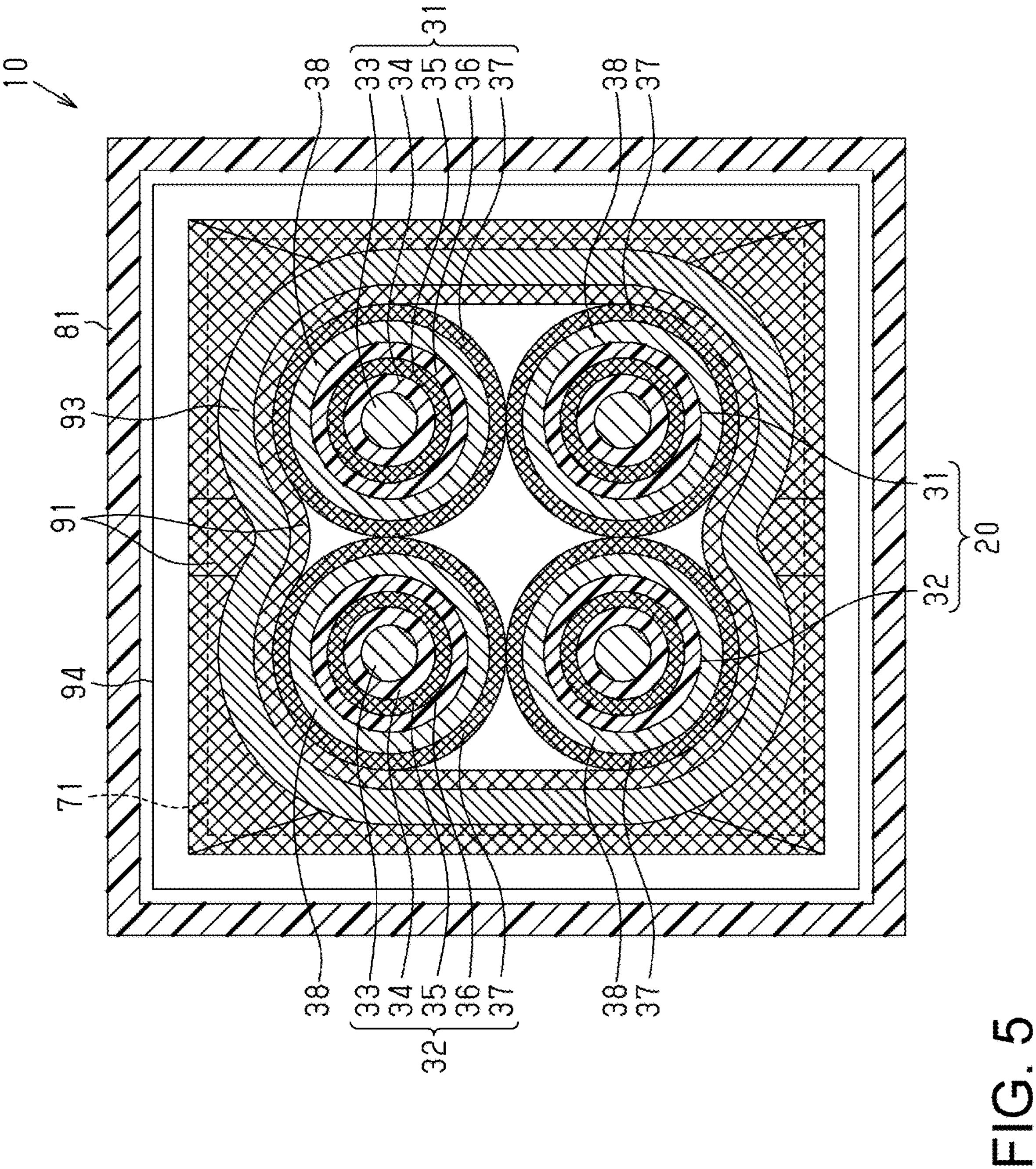
FIG. 5 is a schematic transverse cross-sectional view of the wire harness according to the embodiment (cross-sectional view taken along line 5-5 in FIG. 2).

As shown in FIG. 5, the first insulating coating 34 covers the entire outer peripheral surface of the first core wire 33 in the circumferential direction, for example. The first insulating coating 34 is made of a resin material having insulation, for example.

The first individual shielding member 35 surrounds the entire outer peripheral surface of the first insulating coating 34 in the circumferential direction, for example. The first individual shielding member 35 has flexibility, for example. The first individual shielding member 35 can be a braided wire in which a plurality of metal elemental wires are woven into a cylindrical shape or a metal foil, for example. In the present embodiment, the first individual shielding member 35 is a braided wire. The material of the first individual shielding member 35 can be a copper-based or aluminum-based metal material, for example.

The first sheath 36 surrounds the entire outer peripheral surface of the first individual shielding member 35 in the circumferential direction, for example. The first sheath 36 is made of a resin material having electrical insulation, for example.

The transverse cross-sectional shape of each of the electrical wires 31 and 32 is a circular shape, for example. The transverse cross-sectional shape of each of the electrical wires 31 and 32 is not limited to a circular shape, and may be any shape such as a semicircular shape, a polygonal shape, a square shape, or a flat shape, for example.

Each electrical wire member 20 has two electrical wires 31 and 32.

Therefore, the two electrical wire members 20 have a total of four electrical wires 31 and 32, including two electrical wires 31 and two electrical wires 32. The four electrical wires 31 and 32 are arranged side by side in a direction intersecting the length direction of the electrical wire members 20, for example. For example, the four electrical wires 31 and 32 are arranged side by side along a first direction (up-down direction in the drawing) that intersects the length direction of the electrical wire members 20 and a second direction (right-left direction in the drawing) that intersects the length direction of the electrical wire members 20 and intersects the first direction. Specifically, the two electrical wires 31 are arranged side by side along the first direction. The two electrical wires 32 are arranged side by side along the first direction. The electrical wires 31 and the electrical wires 32 are arranged side by side along the second direction. In this manner, the four electrical wires 31 and 32 are arranged side by side vertically and horizontally in the transverse cross section. The first direction in the present embodiment coincides with the arrangement direction of the single-core wires 21 (see FIG. 3).

As shown in FIG. 2, the rear end of each first individual shielding member 35 has a first exposed portion 37 that is exposed from the first sheath 36, for example. At the rear end of each electrical wire 31, 32, the first sheath 36 is peeled off by a predetermined length from the terminal end of the electrical wire 31, 32 to expose the rear end of the first individual shielding member 35 as the first exposed portion 37. Each first exposed portion 37 is folded back toward the rear end of the first sheath 36, for example. Each first exposed portion 37 is folded back so as to cover the outer periphery of the rear end of the first sheath 36, for example. An underlay member 38 is attached to the outer periphery of the rear end of each first sheath 36. The underlay member 38 is attached individually to each of the plurality of electrical wires 31 and is attached individually to each of the plurality of electrical wires 32. The underlay member 38 is a metallic ring member, for example. The underlay member 38 is formed in a ring shape so as to surround the entire outer peripheral surface of the first sheath 36 in the circumferential direction, for example. The first exposed portion 37 is folded back so as to cover the outer periphery of the underlay member 38, for example. That is, the first exposed portion 37 surrounds the outer periphery of the underlay member 38. As shown in FIG. 5, the first exposed portion 37 surrounds the entire outer peripheral surface of the underlay member 38 in the circumferential direction, for example. The transverse cross-sectional shape of the portion where the underlay member 38 is provided is formed in a structure in which the first insulating coating 34, the first individual shielding member 35, the first sheath 36, the underlay member 38, and the first exposed portion 37 are layered in this order on the outer peripheral surface of the first core wire 33. The material of the underlay member 38 can be a copper-based or aluminum-based metal material, for example.

The two electrical wire members 20 have four first exposed portions 37. The four first exposed portions 37 are arranged vertically and horizontally in the transverse cross section, as are the four electrical wires 31 and 32. The four first exposed portions 37 are arranged together such that their outer peripheral surfaces are in contact with each other.

As shown in FIGS. 2 and 4, at the rear end of each electrical wires 31, 32 provided behind the first exposed portion 37, the rear end of the first core wire 33 is exposed from the first insulating coating 34. At the rear end of each electrical wire 31, 32, the first insulating coating 34 is peeled off by a predetermined length from the terminal end of the electrical wire 31, 32 to expose the rear end of the first core wire 33. At each first connection part 51, the rear end of the first core wire 33 in the electrical wire 31 and the rear end of the first core wire 33 in the electrical wire 32 are joined to the front end of the single-core wire 21. For example, at each first connection part 51, the first core wire 33 in the electrical wire 31 and the first core wire 33 in the electrical wire 32 are individually overlaid and joined to one single-core wire 21 in the radial direction, that is, in a direction intersecting the length direction of the first core wire 33 and the single-core wire 21. For example, at each first connection part 51, the two first core wires 33 are individually overlaid and joined to one long side surface 22 (here, the upper surface) of the single-core wire 21. The method for connecting the first core wires 33 and the single-core wire 21 is not particularly limited. For example, the method for connecting the first core wires 33 and the single-core wire 21 can be ultrasonic welding, laser welding, or the like.

As shown in FIG. 3, the two electrical wire members 20 have two first connection parts 51 (connections). The two first connection parts 51 are provided at positions shifted from each other in the length direction of the electrical wire members 20, for example. That is, the two first connection parts 51 are provided at positions not overlapping each other in the radial direction of the first core wires 33 and the single-core wires 21. In other words, the two first connection parts 51 are provided at positions not overlapping each other in the overlaying direction of the single-core wires 21 and the first core wires 33 (the up-down direction in the drawing).

(Configuration of Electrical Wires 41)

The electrical wires 41 shown in FIGS. 2 and 3 are greater in pliability than the single-core wires 21, for example. The electrical wires 41 are greater in flexibility than the single-core wires 21, for example. The electrical wires 41 are greater in bendability than the single-core wire 21, for example.

Each electrical wire 41 has a second core wire 43 that is made of a plurality of metal elemental wires and a second insulating coating 44 that surrounds the outer periphery of the second core wire 43 and has electrical insulation. Each electrical wire 41 has a cylindrical second individual shielding member 45 (second individual shield) that surrounds the outer periphery of the second insulating coating 44 and has electrical conductivity, and a second sheath 46 that surrounds the outer periphery of the second individual shielding member 45 and has electrical insulation, for example. In the present embodiment, the electrical wires 41 are shielded electrical wires.

The second core wire 43 can be a twisted wire or a braided wire, for example. In the present embodiment, the second core wire 43 is a twisted wire. The material of the second core wire 43 can be a metal material such as a copper-based or aluminum-based material, for example.

Figure 6:
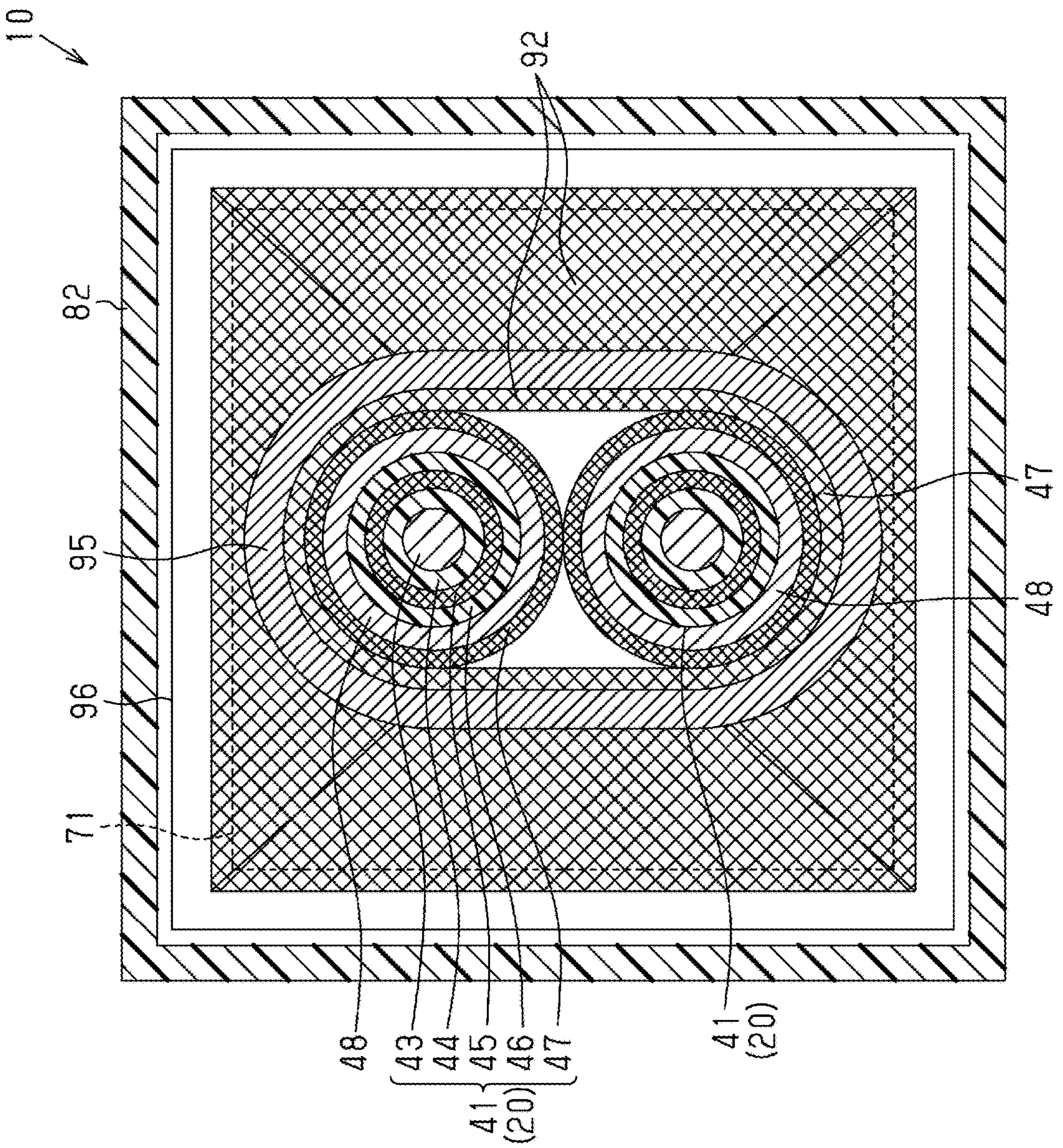
FIG. 6 is a schematic transverse cross-sectional view of the wire harness according to the embodiment (cross-sectional view taken along line 6-6 in FIG. 2).

As shown in FIG. 6, the second insulating coating 44 covers the entire outer peripheral surface of the second core wire 43 in the circumferential direction, for example. The second insulating coating 44 is made of a resin material having electrical insulation, for example.

The second individual shielding member 45 surrounds the entire outer peripheral surface of the second insulating coating 44 in the circumferential direction, for example. The second individual shielding member 45 has flexibility, for example. The second individual shielding member 45 can be a braided wire or a metal foil, for example. In the present embodiment, the second individual shielding member 45 is a braided wire. The material of the second individual shielding member 45 can be a copper-based or aluminum-based metal material, for example.

The second sheath 46 surrounds the entire outer peripheral surface of the second individual shielding member 45 in the circumferential direction, for example. The second sheath 46 is made of a resin material having electrical insulation, for example.

The transverse cross-sectional shape of each electrical wire 41 is circular, for example. The transverse cross-sectional shape of each electrical wire 41 is not limited to a circular shape, and may be any shape, such as a semicircular shape, a polygonal shape, a square shape, or a flat shape.

As shown in FIG. 3, each electrical wire member 20 has one electrical wire 41. Therefore, the two electrical wire members 20 have two electrical wires 41. The two electrical wires 41 are arranged side by side in the direction intersecting the length direction of the electrical wire member 20. The two electrical wires 41 are arranged side by side along the direction in which the plurality of single-core wires 21 are arranged (up-down direction in the drawing), for example.

The front end of the second individual shielding member 45 has a second exposed portion 47 exposed from the second sheath 46, for example. At the front end of each electrical wire 41, the second sheath 46 is peeled off by a predetermined length from the terminal end of the electrical wire 41 to expose the front end of the second individual shielding member 45 as the second exposed portion 47. Each second exposed portion 47 is folded back toward the front end of the second sheath 46, for example. The second exposed portion 47 is folded back so as to cover the outer periphery of the front end of the second sheath 46, for example. An underlay member 48 is attached to the outer periphery of the front end of the second sheath 46. The underlay member 48 is attached individually to each of the plurality of electrical wires 41, for example. The underlay member 48 is a metallic ring member, for example. The underlay member 48 is formed in a ring shape that surrounds the entire outer peripheral surface of the second sheath 46 in the circumferential direction, for example. The second exposed portion 47 is folded back so as to cover the outer periphery of the underlay member 48, for example. That is, the second exposed portion 47 surrounds the outer periphery of the underlay member 48. As shown in FIG. 6, the second exposed portion 47 surrounds the entire outer periphery of the underlay member 48 in the circumferential direction, for example. The transverse cross-sectional shape of the portion where the underlay member 48 is provided is formed into a structure in which the second insulating coating 44, the second individual shielding member 45, the second sheath 46, the underlay member 48, and the second exposed portion 47 are layered in this order on the outer peripheral surface of the second core wire 43. The material of the underlay member 48 can be a copper-based or aluminum-based metal material, for example.

As shown in FIG. 3, at the front end of each electrical wire 41 provided in front of the second exposed portion 47, the front end of the second core wire 43 is exposed from the second insulating coating 44. At the front end of each electrical wire 41, the second insulating coating 44 is peeled off by a predetermined length from the terminal end of the electrical wire 41 to expose the front end of the second core wire 43. At each second connection part 52, the front end of the second core wire 43 exposed from the second insulating coating 44 and the rear end of the single-core wire 21 are joined together. For example, at each second connection part 52, the second core wire 43 and the single-core wire 21 are overlaid and joined together in the radial direction, that is, in the direction intersecting the length direction of the second core wire 43 and the single-core wire 21. For example, at each second connection part 52, one second core wire 43 is overlaid and joined to the long side surface 22 (here, the upper surface) of the single-core wire 21. As shown in FIG. 2, in each electrical wire member 20 of the present embodiment, the first core wire 33 of the electrical wire 31, 32 is joined to the front end of one long side surface 22 of each single-core wire 21, and the second core wire 43 of the electrical wire 41 is joined to the rear end of the one long side surface 22. That is, the first core wire 33 of the electrical wire 31, 32 is joined to one long side surface 22 of the pair of long side surfaces 22 of each single-core wire 21, and the second core wire 43 of the electrical wire 41 is joined to the one long side surface 22 of the pair of long side surfaces 22 of each single-core wire 21. The method for connecting the second core wires 43 and the single-core wires 21 is not particularly limited. For example, the method for connecting the second core wires 43 and the single-core wires 21 can be ultrasonic welding, laser welding, or the like.

As shown in FIG. 3, the two electrical wire members 20 have two second connection parts 52. The two second connection parts 52 are provided at positions shifted from each other in the length direction of the electrical wire members 20, for example. That is, the two second connection parts 52 are provided at positions not overlapping each other in the radial direction of the electrical wires 41 and the single-core wires 21. In other words, the two second connection parts 52 are provided at positions not overlapping each other in the overlaying direction of the single-core wires 21 and the second core wires 43 (the up-down direction in the drawing).

The plurality of single-core wires 21 are different from each other in lengthwise dimension, for example. For example, the single-core wire 21 arranged on the upper side of the drawing is formed shorter than the single-core wire 21 arranged on the lower side of the drawing. For this reason, the single-core wire 21 on the upper side of the drawing is not arranged above the rear end of the single-core wire 21 arranged on the lower side of the drawing, and the single-core wire 21 on the upper side of the drawing is not arranged above the front end of the single-core wire 21 arranged on the lower side of the drawing. Therefore, the first connection part 51 of the electrical wire member 20 arranged on the lower side of the drawing can be provided so as not to overlap a part of the single-core wire 21 arranged on the upper side of the drawing in the length direction of the electrical wire members 20.

(Configuration of Coating Member 60)

The coating member 60 is provided on each of the plurality of electrical wire members 20, for example. Each coating member 60 is formed so as to cover the outer periphery of the first connection part 51. Each coating member 60 is formed in an elongated cylindrical shape, for example. As shown in FIG. 2, each coating member 60 is formed so as to cover the first core wire 33 of the electrical wire 31, 32 exposed from the first insulating coating 34, for example. Each coating member 60 is formed so as to cover at least the area from the rear end of the first insulating coating 34 of the electrical wire 31, 32 to the first connection part 51, for example. Each coating member 60 is formed so as to cover the outer periphery of the single-core wire 21 over the entire length of the single-core wire 21 in the length direction, for example. Each coating member 60 is formed so as to cover the outer periphery of the second connection part 52, for example. Each coating member 60 is formed so as to cover the second core wire 43 exposed from the second insulating coating 44, for example. Each coating member 60 is formed so as to coat the area from the rear end of the first insulating coating 34 to the front end of the second insulating coating 44 of the electrical wire 31, 32, for example. For example, the front end of each coating member 60 coats the outer peripheral surface of the rear end of the first insulating coating 34 in the electrical wire 31, 32, and the rear end of each coating member 60 coats the outer peripheral surface of the front end of the second insulating coating 44. Each coating member 60 surrounds the entire outer periphery of the single-core wire 21, the entire outer periphery of the electrical wire 31, 32, and the entire outer periphery of the electrical wire 41 in the circumferential direction. Each coating member 60 is formed so as to expose the first individual shielding member 35 in the electrical wire 31, 32 and to expose the second individual shielding member 45, for example.

In other words, each coating member 60 is formed so as not to coat the outer periphery of the first individual shielding member 35 in the electrical wire 31, 32, for example. The coating member 60 is formed so as not to coat the outer periphery of the second individual shielding member 45, for example. Each coating member 60 coats the outer peripheral surface of the rear end of the first insulating coating 34 that is exposed from the first exposed portion 37 and the first sheath 36, and coats the outer peripheral surface of the front end of the second insulating coating 44 that is exposed from the second exposed portion 47 and the second sheath 46, for example. The inner peripheral surface of each coating member 60 is formed so as to be in close contact with the outer peripheral surface of the first insulating coating 34, for example. The inner peripheral surface of each coating member 60 is formed so as to be in close contact with the outer peripheral surface of the second insulating coating 44, for example. The inner peripheral surface of each coating member 60 is formed so as to be in close contact with the outer peripheral surface of the single-core wire 21, for example. Each coating member 60 has the function of maintaining electrical insulation among the first connection part 51, the second connection part 52, the single-core wire 21, the first core wire 33 exposed from the first insulating coating 34, and the second core wire 43 exposed from the second insulating coating 44, for example. In addition, each coating member 60 has the function of waterproofing the first connection part 51, the second connection part 52, the single-core wire 21, the first core wire 33 exposed from the first insulating coating 34, and the second core wire 43 exposed from the second insulating coating 44, for example.

The coating member 60 can be a shrink tube, a rubber tube, a resin mold, a hot melt adhesive, or a tape member, for example. In the present embodiment, the coating member 60 is a heat shrink tube. The material of the coating member 60 can be a synthetic resin containing a polyolefin resin such as cross-linked polyethylene or cross-linked polypropylene as a main component, for example.

(Configuration of Cylindrical Member 71)

The cylindrical member 71 is formed in an elongated cylindrical shape, for example. The plurality of electrical wire members 20 are stored in the internal space of the cylindrical member 71. The cylindrical member 71 is formed so as to collectively surround the entire outer peripheries of the plurality of electrical wire members 20 in the circumferential direction. The cylindrical member 71 is formed so as to surround only the outer periphery of a part of each electrical wire member 20 in the length direction, in this example, the middle part, for example. The cylindrical member 71 surrounds the outer periphery of the single-core wire 21 in the length direction of each electrical wire member 20, for example. The cylindrical member 71 collectively surrounds the outer peripheries of the single-core wires 21 over the entire length of the single-core wire 21 in the length direction, for example. The cylindrical member 71 surrounds the outer periphery of the first connection part 51 and the outer periphery of the second connection part 52 in the length direction of each electrical wire member 20, for example. The cylindrical member 71 surrounds the outer periphery of the rear end of the first insulating coating 34 in the electrical wire 31, 32 and surrounds the outer periphery of the front end of the second insulating coating 44 in the electrical wire 41, in the length direction of each electrical wire member 20, for example. The cylindrical member 71 is formed so as to expose the first individual shielding member 35 in the electrical wire 31, 32 and expose the second individual shielding member 45, in the length direction of each electrical wire member 20, for example. In other words, the first individual shielding members 35 in the electrical wires 31 and 32 are arranged outside the cylindrical member 71. The second individual shielding members 45 are arranged outside the cylindrical member 71.

The cylindrical member 71 of the present embodiment is a shield pipe having electrical conductivity. The cylindrical member 71 can be a metallic pipe made of metal, for example. The material of the cylindrical member 71 can be a copper-based or aluminum-based metal material, for example. The cylindrical member 71, which is a shield pipe, has an electromagnetic shielding function by which to suppress radiation of electromagnetic waves from the electrical wire members 20, for example.

The transverse cross-sectional shape of the cylindrical member 71 can be any shape. The transverse cross-sectional shape of the cylindrical member 71 is a circular shape, a semicircular shape, a polygonal shape, a square shape, or a flat shape, for example. The cross-sectional shape of the cylindrical member 71 can be set to a shape corresponding to the transverse cross-sectional shape of the single-core wire 21, for example. As shown in FIG. 4, the transverse cross section of the cylindrical member 71 of the present embodiment is formed in a square shape. That is, the cylindrical member 71 of the present embodiment is formed like a square tube in which the cross-sectional shapes of the inner periphery and the outer periphery have square cross sections.

The cylindrical member 71 can be formed by extrusion molding, for example. The cylindrical member 71 is formed such that the transverse cross-sectional shape is constant over the entire length of the cylindrical member 71 in the length direction (axial direction), for example.

(Grounding Structure of First Individual Shielding Member 35, Second Individual Shielding Member 45, and Cylindrical Member 71)

As shown in FIG. 2, the wire harness 10 has a cylindrical first shielding member 91 (cylindrical first shield) with electrical conductivity and a cylindrical second shielding member 92 with electrical conductivity, for example. The wire harness 10 has a coupling member 93 (coupler) that couples the front end of the first shielding member 91 to the first individual shielding members 35, and has a coupling member 94 that couples the rear end of the first shielding member 91 to the front end of the cylindrical member 71, for example. The wire harness 10 has a coupling member 95 that couples the rear end of the second shielding member 92 to the second individual shielding members 45, and has a coupling member 96 that couples the front end of the second shielding member 92 to the rear end of the cylindrical member 71, for example. The first shielding member 91 and the second shielding member 92 have flexibility, for example. The first shielding member 91 and the second shielding member 92 can be braided wires or metal foils, for example. In the present embodiment, the first shielding member 91 and the second shielding member 92 are braided wires. The material of the first shielding member 91 and the second shielding member 92 can be a copper-based or aluminum-based metal material, for example. The coupling members 93, 94, 95, and 96 can be crimping rings, zip ties, or tape members, for example. In the present embodiment, the coupling members 93, 94, 95, and 96 are crimping rings.

The material of the crimping rings can be an iron-based, aluminum-based, or copper-based metal material, for example.

Figure 7:
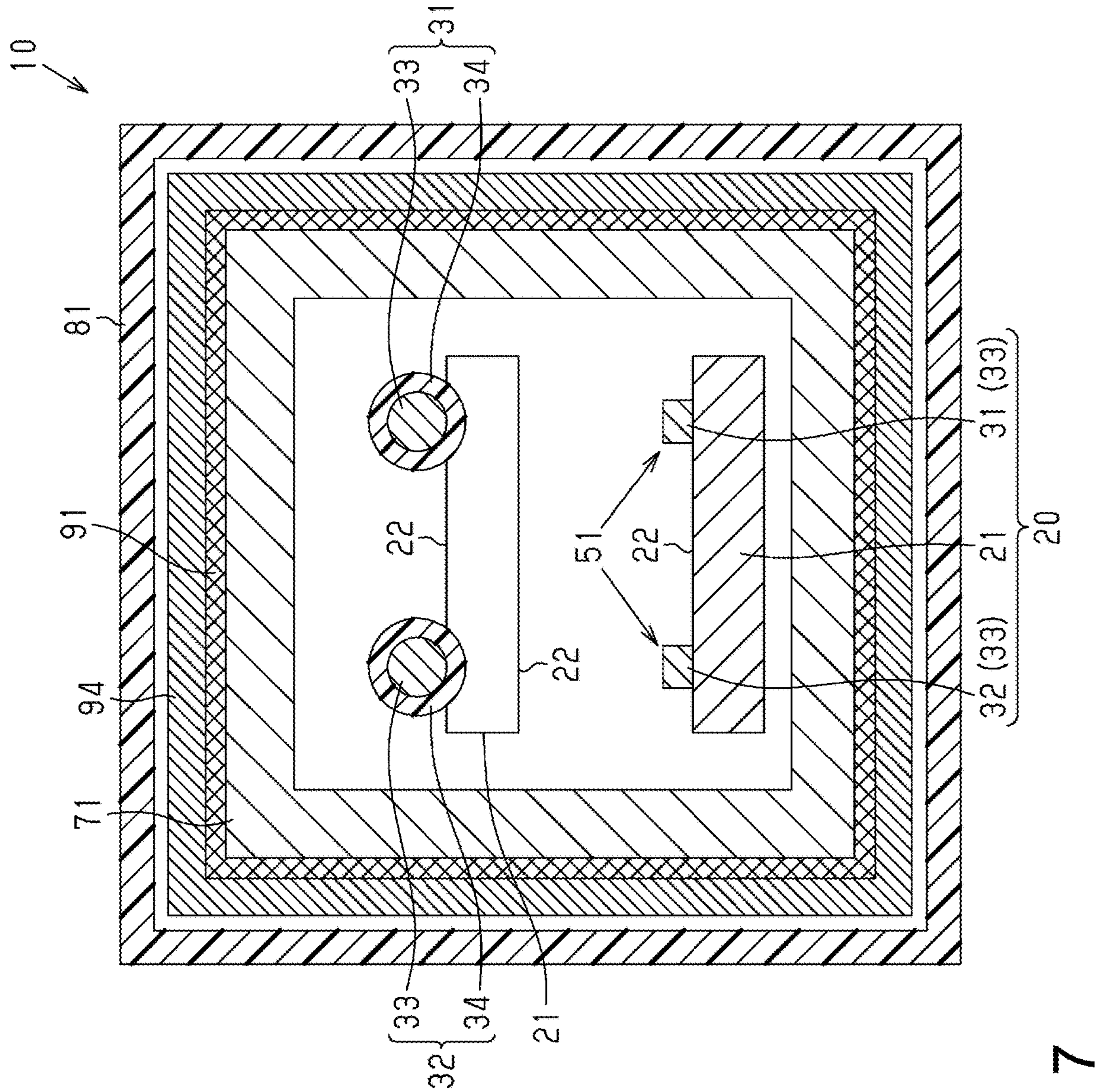
FIG. 7 is a schematic transverse cross-sectional view of the wire harness according to the embodiment (cross-sectional view taken along line 7-7 in FIG. 2).

The first shielding member 91 is formed in an elongated cylindrical shape, for example. The first shielding member 91 is formed so as to surround the outer peripheries of portions of the plurality of electrical wire members 20 that are exposed from the first individual shielding members 35 and the cylindrical member 71, for example. The first shielding member 91 is formed so as to span across the first exposed portions 37 of the electrical wires 31 and 32 and the front end of the cylindrical member 71 in the length direction of the electrical wire members 20, for example. The first shielding member 91 is formed so as to collectively surround the outer peripheries of the plurality of electrical wires 31 and 32 provided between the first exposed portions 37 and the cylindrical member 71, for example. The front end (first end) of the first shielding member 91, which is one end in the axial direction (length direction), is formed so as to cover the outer peripheries of the first exposed portions 37 of the electrical wires 31 and 32, for example. As shown in FIG. 5, the front end of the first shielding member 91 is formed so as to collectively surround the outer peripheries of the plurality of first exposed portions 37 (four in the present embodiment), for example. The front end of the first shielding member 91 is provided so as to overlap the underlay members 38 in the radial direction of the electrical wire members 20, for example. The first shielding member 91 collectively surrounds the entire outer peripheries of the plurality of electrical wire members 20 in the circumferential direction, for example. As shown in FIG. 3, the rear end (second end) of the first shielding member 91, which is the other end in the axial direction, is formed so as to surround the outer periphery of the front end of the cylindrical member 71, for example. As shown in FIG. 7, the first shielding member 91 surrounds the entire outer periphery of the cylindrical member 71 in the circumferential direction, for example.

As shown in FIG. 5, the coupling member 93 fixes the front end of the first shielding member 91 to the outer peripheral surfaces of the electrical wires 31 and 32 in a state where the front end of the first shielding member 91 is in contact with the first exposed portions 37, for example. The coupling member 93 is attached to the outer peripheral surfaces of the underlay members 38, for example. The coupling member 93 is formed in a ring shape along the outer peripheral surfaces of the plurality of underlay members 38, for example. The coupling member 93 is fitted to the outside of the underlay members 38 in a manner in which the front end of the first shielding member 91 and the first exposed portions 37 are sandwiched between the coupling member 93 and the outer peripheral surfaces of the underlay members 38. The coupling member 93 is tightened radially inward of the electrical wire members 20, so that the front end of the first shielding member 91 is fixed to the outer peripheral surfaces of the electrical wires 31 and 32 in a state where the front end of the first shielding member 91 is in direct contact with the outer peripheral surfaces of the plurality of first exposed portions 37. The front end of the first shielding member 91 is partially in direct contact with all of the four first exposed portions 37, for example. In other words, all of the four first exposed portions 37 are in direct contact with the first shielding member 91. Accordingly, the first shielding member 91 is electrically and mechanically connected to the plurality of first exposed portions 37. At the connection part between the first exposed portions 37 and the first shielding member 91, the plurality of first exposed portions 37 are bundled so as to be in contact with each other. The outer peripheral surface of each first exposed portion 37 is partially in direct contact with the outer peripheral surface of the adjacent first exposed portion 37, for example.

As shown in FIG. 7, the coupling member 94 fixes the rear end of the first shielding member 91 to the outer peripheral surface of the cylindrical member 71 in a state where the rear end of the first shielding member 91 is in contact with the outer peripheral surface of the cylindrical member 71, for example. The coupling member 94 is attached to the outer peripheral surface of the cylindrical member 71. The coupling member 94 is formed in a ring shape along the outer peripheral surface of the cylindrical member 71, for example. In the present embodiment, the coupling member 94 is formed in a square tube shape. The coupling member 94 is fitted to the outside of the cylindrical member 71 in a manner in which the rear end of the first shielding member 91 is sandwiched between the coupling member 94 and the outer peripheral surface of the cylindrical member 71, for example. The coupling member 94 is tightened radially inward of the cylindrical member 71, so that the rear end of the first shielding member 91 is fixed to the outer peripheral surface of the cylindrical member 71 in a state where the rear end of the first shielding member 91 is in direct contact with the outer peripheral surface of the cylindrical member 71. Accordingly, the first shielding member 91 is electrically and mechanically connected to the cylindrical member 71.

In this manner, in the wire harness 10 shown in FIG. 2, the first exposed portions 37 (that is, the first individual shielding members 35) of the electrical wires 31 and 32 and the cylindrical member 71 are electrically connected to each other via the first shielding member 91. Although not shown, the front ends of the first individual shielding members 35 are ground-connected (grounded) to a vehicle body panel or the like via the connectors C2 and C3 (see FIG. 1). Accordingly, the first individual shielding members 35, the first shielding member 91, and the cylindrical member 71 are ground-connected.

The second shielding member 92 is formed in an elongated cylindrical shape, for example. The second shielding member 92 is formed so as to surround the outer peripheries of portions of the plurality of electrical wire members 20 exposed from the second individual shielding members 45 and the cylindrical member 71, for example. The second shielding member 92 is formed so as to span across the second exposed portions 47 and the rear end of the cylindrical member 71 in the length direction of the electrical wire members 20, for example. The second shielding member 92 is formed so as to collectively surround the outer peripheries of the plurality of electrical wires 41 provided between the second exposed portions 47 and the cylindrical member 71, for example. The rear end of the second shielding member 92, which is one end in the axial direction (length direction), is formed so as to cover the outer peripheries of the second exposed portions 47 of the electrical wires 41, for example. As shown in FIG. 6, the rear end of the second shielding member 92 is formed so as to collectively surround the outer peripheries of the plurality of second exposed portions 47, for example. The rear end of the second shielding member 92 is provided so as to overlap the underlay members 48 in the radial direction of the electrical wire members 20, for example. The second shielding member 92 collectively surrounds the entire outer peripheries of the plurality of electrical wire members 20 in the circumferential direction, for example. As shown in FIG. 3, the front end of the second shielding member 92, which is the other end in the axial direction, is formed so as to surround the outer periphery of the rear end of the cylindrical member 71, for example. The second shielding member 92 surrounds the entire outer periphery of the cylindrical member 71 in the circumferential direction, for example.

As shown in FIG. 6, the coupling member 95 fixes the rear end of the second shielding member 92 to the outer peripheral surfaces of the second exposed portions 47 in a state where the rear end of the second shielding member 92 is in contact with the second exposed portions 47, for example. The coupling member 95 is attached to the outer peripheral surfaces of the underlay members 48, for example. The coupling member 95 is formed in a ring shape along the outer peripheral surfaces of the plurality of underlay members 48, for example. The coupling member 95 is fitted to the outside of the underlay members 48 in a manner in which the rear end of the second shielding member 92 and the second exposed portions 47 are sandwiched between the coupling member 95 and the outer peripheral surfaces of the underlay members 48, for example. The coupling member 95 is tightened radially inward of the electrical wire members 20, so that the rear end of the second shielding member 92 is fixed to the outer peripheral surfaces of the electrical wires 41 in a state where the rear end of the second shielding member 92 is in direct contact with the outer peripheral surfaces of the plurality of second exposed portions 47. For example, the rear end of the second shielding member 92 is partially in direct contact with all of the two second exposed portions 47. In other words, all of the two second exposed portions 47 are in direct contact with the second shielding member 92. Accordingly, the second shielding member 92 is electrically and mechanically connected to the plurality of second exposed portions 47. At the connection part between the second exposed portions 47 and the second shielding member 92, the plurality of second exposed portions 47 are bundled so as to be in contact with each other. For example, the outer peripheral surface of each second exposed portion 47 is partially in direct contact with the outer peripheral surface of the other second exposed portion 47.

The coupling member 96 fixes the front end of the second shielding member 92 to the outer peripheral surface of the cylindrical member 71 in a state where the front end of the second shielding member 92 is in contact with the outer peripheral surface of the cylindrical member 71, for example. The coupling member 96 is attached to the outer peripheral surface of the cylindrical member 71. The coupling member 96 is formed in a ring shape along the outer peripheral surface of the cylindrical member 71. In the present embodiment, the coupling member 96 is formed in a square tube shape. The coupling member 96 is fitted to the outside of the cylindrical member 71 in a manner in which the front end of the second shielding member 92 is sandwiched between the coupling member 96 and the outer peripheral surface of the cylindrical member 71, for example. The coupling member 96 is tightened radially inward of the cylindrical member 71, so that the front end of the second shielding member 92 is fixed to the outer peripheral surface of the cylindrical member 71 in a state where the front end of the second shielding member 92 is in direct contact with the outer peripheral surface of the cylindrical member 71. Accordingly, the second shielding member 92 is electrically and mechanically connected to the cylindrical member 71.

In this manner, in the wire harness 10 shown in FIG. 3, the second exposed portions 47 (that is, the second individual shield members 45) and the cylindrical member 71 are electrically connected via the second shielding member 92. Although not shown, the rear end of each second individual shielding member 45 is earth-connected (grounded) to the vehicle body panel or the like through the connector C1 (see FIG. 1), for example. Accordingly, the second individual shielding members 45, the second shielding member 92, and the cylindrical member 71 are ground-connected.

(Waterproof Structure of Wire Harness 10)

As shown in FIG. 2, the wire harness 10 has a fixing member 83 that fixes the front end of the waterproof member 81 to the electrical wire members 20, and a fixing member 84 that fixes the rear end of the waterproof member 81 to the cylindrical member 71, for example. The wire harness 10 has a fixing member 85 that fixes the rear end of the waterproof member 82 to the electrical wire members 20, and a fixing member 86 that fixes the front end of the waterproof member 82 to the cylindrical member 71, for example. The waterproof member 81 and the waterproof member 82 can be shrink tubes or rubber tubes, for example. The material of the shrink tubes can be a synthetic resin containing a polyolefin resin such as cross-linked polyethylene or cross-linked polypropylene as a main component, for example. The fixing members 83, 84, 85, and 86 can be crimping rings, zip ties, or tape members, for example. In the present embodiment, the fixing members 83, 84, 85, and 86 are zip ties.

The waterproof member 81 is formed in an elongated cylindrical shape, for example. The waterproof member 81 is formed so as to collectively surround the outer peripheries of the plurality of electrical wires 31 and 32, for example. The waterproof member 81 is formed so as to cover the outer peripheries of the electrical wires 31 and 32 that protrude forward from the front end of the cylindrical member 71, for example. The waterproof member 81 is formed so as to cover the outer peripheries of the first exposed portions 37, for example. The waterproof member 81 is formed so as to cover the outer peripheries of the first shielding member 91 and the coupling members 93 and 94, for example. The waterproof member 81 is formed so as to span across the electrical wires 31 and 32 arranged in front of the first exposed portions 37 and the outer periphery of the cylindrical member 71 arranged behind the coupling member 94, for example. For example, the front end of the waterproof member 81 coats the electrical wires 31 and 32 arranged in front of the first exposed portions 37, and the rear end of the waterproof member 81 coats the outer periphery of the cylindrical member 71 arranged behind the coupling member 94. The waterproof member 81 collectively surrounds the entire outer peripheries of the electrical wire members 20 and the entire outer periphery of the cylindrical member 71 in the circumferential direction.

The front end of the waterproof member 81 is bonded by an adhesive 87 to the entire outer peripheral surfaces of the electrical wires 31 and 32 arranged in front of the first exposed portions 37, in the circumferential direction, for example. The adhesive 87 can be a hot melt adhesive such as a polyolefin resin, a polyester resin, or a polyamide resin, for example.

The adhesive 87 seals the gaps between the outer peripheral surfaces of the electrical wires 31 and 32 arranged in front of the first exposed portions 37 and the inner peripheral surface of the waterproof member 81, for example. The adhesive 87 is formed so as to fill the gaps between the outer peripheral surfaces of the electrical wires 31 and 32 and the inner peripheral surface of the waterproof member 81, for example. The adhesive 87 is formed so as to fill the gap between the electrical wires 31, the gap between the electrical wires 32, and the gap between the electrical wires 31 and 32. The adhesive 87 is in close contact with the entire inner peripheral surface of the waterproof member 81 in the circumferential direction, and is in close contact with the entire outer peripheral surfaces of the electrical wires 31 and 32 in the circumferential direction, for example. This makes it possible to suppress the intrusion of liquid such as water into the waterproof member 81 through the front end of the waterproof member 81.

The fixing member 83 is provided on the outer peripheral surface of the front end of the waterproof member 81. The front end of the waterproof member 81 is tightened from the outer peripheral side by the fixing member 83 and fixed to the electrical wires 31 and 32. The front end of the waterproof member 81 is tightened radially inward by the fixing member 83 and is fixed to the outer peripheral surfaces of the electrical wires 31 and 32 via the adhesive 87, for example.

The fixing member 84 is provided on the outer peripheral surface of the rear end of the waterproof member 81. The rear end of the waterproof member 81 is tightened from the outer peripheral side by the fixing member 84 and fixed to the cylindrical member 71. For example, the rear end of the waterproof member 81 is tightened from the outer circumferential side by the fixing member 84 until it comes into liquid-tight contact with the outer peripheral surface of the cylindrical member 71. This makes it possible to suppress the intrusion of liquid such as water into the waterproof member 81 through between the waterproof member 81 and the cylindrical member 71.

The waterproof member 82 is formed in an elongated cylindrical shape, for example. The waterproof member 82 is formed so as to collectively surround the outer peripheries of the plurality of electrical wires 41, for example. The waterproof member 82 is formed so as to cover the outer peripheries of the electrical wires 41 that protrude rearward from the rear end of the cylindrical member 71, for example. The waterproof member 82 is formed so as to cover the outer peripheries of the second exposed portions 47, for example. The waterproof member 82 is formed so as to cover the outer peripheries of the second shielding member 92 and the coupling members 95 and 96, for example. The waterproof member 82 is formed so as to span across the electrical wires 41 arranged behind the second exposed portions 47 and the outer periphery of the cylindrical member 71 arranged in front of the coupling member 96, for example. For example, the rear end of the waterproof member 82 coats the electrical wires 41 arranged behind the second exposed portions 47, and the front end of the waterproof member 82 coats the outer periphery of the cylindrical member 71 arranged in front of the coupling member 96. The waterproof member 82 collectively surrounds the entire outer peripheries of the electrical wire members 20 and the entire outer periphery of the cylindrical member 71 in the circumferential direction.

The rear end of the waterproof member 82 is bonded by an adhesive 88 to the entire outer peripheral surfaces of the electrical wires 41 arranged behind the second exposed portions 47 in the circumferential direction, for example. The adhesive 88 can be a hot melt adhesive such as a polyolefin resin, a polyester resin, or a polyamide resin, for example.

The adhesive 88 seals the gaps between the outer peripheral surfaces of the electrical wires 41 arranged behind the second exposed portions 47 and the inner peripheral surface of the waterproof member 82, for example. The adhesive 88 is formed so as to fill the gaps between the outer peripheral surfaces of the electrical wires 41 and the inner peripheral surface of the waterproof member 82, for example. The adhesive 88 is formed so as to fill the gap between the electrical wires 41. The adhesive 88 is in close contact with the entire inner peripheral surface of the waterproof member 82 in the circumferential direction, and is in close contact with the entire outer peripheral surface of each electrical wire 41 in the circumferential direction, for example. This makes it possible to suppress the intrusion of liquid such as water into the waterproof member 82 through the rear end of the waterproof member 82.

The fixing member 85 is provided on the outer peripheral surface of the rear end of the waterproof member 82. The rear end of the waterproof member 82 is tightened from the outer peripheral side by the fixing member 85 and fixed to the electrical wires 41. The rear end of the waterproof member 82 is tightened radially inward by the fixing member 85, and thus is fixed to the outer peripheral surfaces of the electrical wires 41 via the adhesive 88, for example.

The fixing member 86 is provided on the outer peripheral surface of the front end of the waterproof member 82. The front end of the waterproof member 82 is tightened from the outer peripheral side by the fixing member 86 and fixed to the cylindrical member 71. For example, the front end of the waterproof member 82 is tightened from the outer peripheral side by the fixing member 86 until it comes into liquid-tight contact with the outer peripheral surface of the cylindrical member 71. This makes it possible to suppress the intrusion of liquid such as water into the waterproof member 82 through between the waterproof member 82 and the cylindrical member 71.

Next, operations and effects of the present embodiment will be described.

(1) The first shielding member 91 is electrically connected to the first individual shielding members 35 in a state of contact with the plurality of first exposed portions 37, and is also electrically connected to the cylindrical member 71. Accordingly, the first individual shielding members 35 and the cylindrical member 71 can be electrically connected via the first shielding member 91. Therefore, the electrical wire members 20 can be suitably electromagnetically shielded by the first shielding member 91, the first individual shielding members 35, and the cylindrical member 71. The first shielding member 91 is provided so as to surround the outer peripheries of the portions of the plurality of electrical wire members 20 that are exposed from the first individual shielding members 35 and the cylindrical member 71. Therefore, even if the electrical wire members 20 have portions that are exposed from the first individual shielding members 35 and the cylindrical member 71, the exposed portions can be surrounded by the first shielding member 91 that is different from the first individual shielding members 35 and the cylindrical member 71. Accordingly, the electrical wire members 20 in the exposed portions can be suitably electromagnetically shielded by the first shielding member 91. Therefore, even if the electrical wire members 20 have portions that are exposed from the first individual shielding members 35 and the cylindrical member 71, it is possible to preferably suppress deterioration of the electromagnetic shielding performance at the exposed portions. As a result, it is possible to preferably suppress radiation of the electromagnetic waves generated at the exposed portions to the outside of the wire harness 10.

(2) The first shielding member 91 is formed so as to span across the plurality of first exposed portions 37 and the cylindrical member 71.

Furthermore, the first shielding member 91 is formed so as to collectively surround the outer peripheries of the plurality of first exposed portions 37, and is also formed so as to surround the entire outer periphery of the cylindrical member 71 in the circumferential direction. Therefore, the outer peripheries of the plurality of electrical wires 31 and 32 provided between the first exposed portions 37 and the cylindrical member 71 can be surrounded by the single first shielding member 91, and the plurality of electrical wires 31 and 32 can be suitably electromagnetically shielded by the first shielding member 91.

(3) The underlay members 38, which are metallic ring members, are interposed between the first sheaths 36 and the first exposed portions 37. The plurality of first exposed portions 37 and the first shielding member 91 are sandwiched between the underlay members 38 and the coupling member 93. Accordingly, when the coupling member 93 is tightened to the plurality of first exposed portions 37, the underlay members 38 are interposed between the first exposed portions 37 and the first sheath 36, so that it is possible to suppress deformation of the electrical wires 31 and 32. As a result, the stability of the electrical connection between the first exposed portions 37 and the first shielding member 91 can be improved. In addition, the underlay members 38 are attached to the plurality of electrical wires 31 and 32, so that deformation of the plurality of electrical wires 31 and 32 can be suitably suppressed.

(4) The connection part between the plurality of first exposed portions 37 and the first shielding member 91 has a structure in which the plurality of first exposed portions 37 are bundled so as to be in contact with each other, and each of the plurality of first exposed portions 37 is in contact with the first shielding member 91. According to this configuration, each of the plurality of first exposed portions 37 is in direct contact with the first shielding member 91, so that the stability of the electrical connection between the plurality of first exposed portions 37 and the first shielding member 91 can be improved.

OTHER EMBODIMENTS

The above-described embodiment can be modified as below. The above embodiment and the following modifications can be combined with each other to the extent that they are not technically inconsistent.

In the above-described embodiment, the plurality of first connection parts 51 are arranged at positions shifted from each other in the length direction of the electrical wire members 20, but the present disclosure is not limited this.

Figure 8:
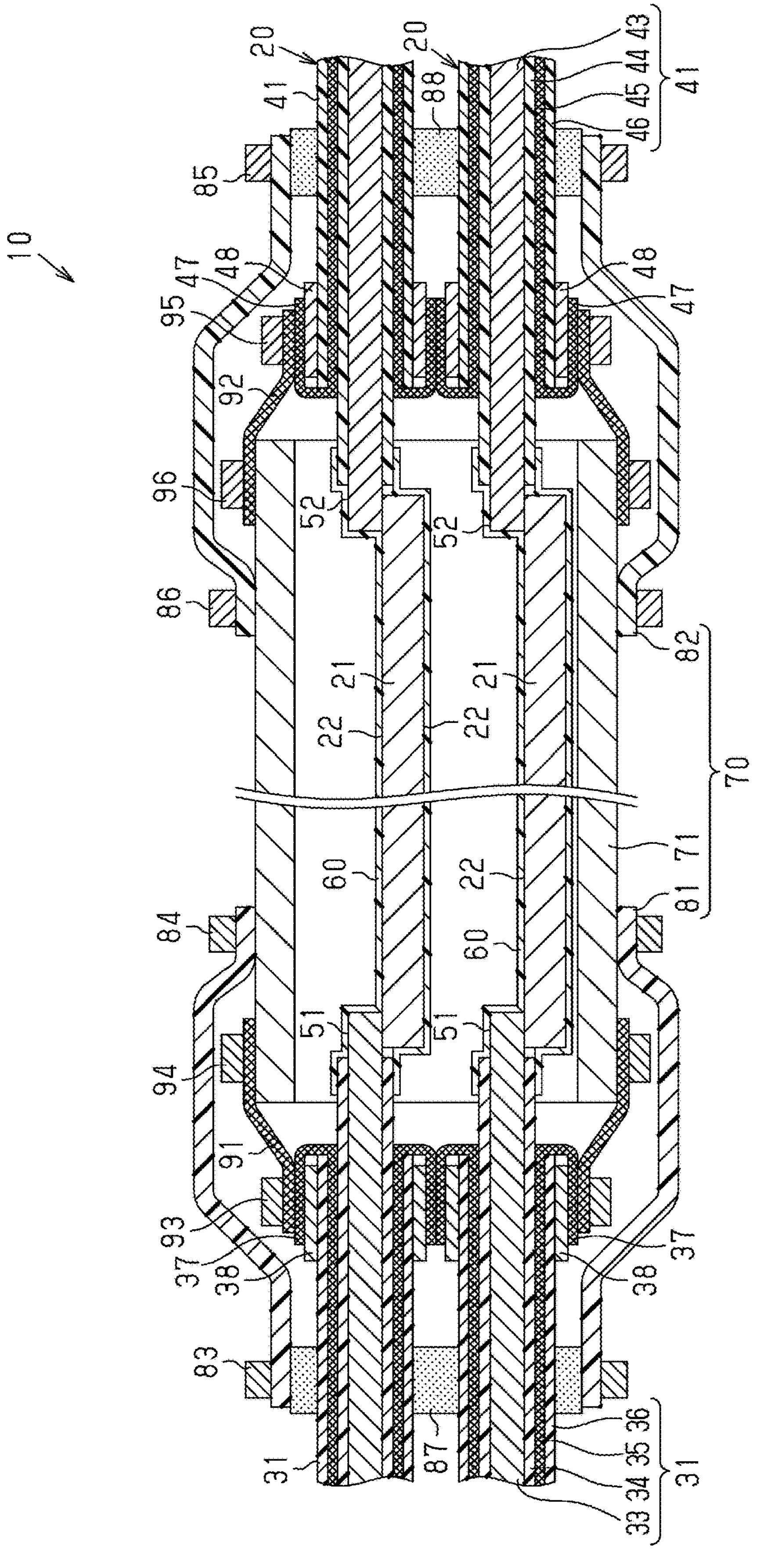
FIG. 8 is a schematic cross-sectional view of a wire harness according to a modification example.

For example, as shown in FIG. 8, the plurality of first connection parts 51 may be arranged, side by side, along the length direction of the electrical wire members 20. For example, the plurality of first connection parts 51 may be arranged at the same positions in the length direction of the electrical wire members 20. That is, the plurality of first connection parts 51 may be provided at positions overlapping each other in the radial direction of the single-core wires 21 and the electrical wires 31. In other words, the plurality of first connection parts 51 may be provided so as to overlap each other in the overlaying direction (up-down direction in the drawing) of the single-core wires 21 and the electrical wires 31 and 32. Similarly, the plurality of second connection parts 52 may be arranged at the same positions in the length direction of the electrical wire members 20.

In the above-described embodiment, the plurality of single-core wires 21 are set with different lengths, but the present disclosure is not limited to this configuration. For example, the plurality of single-core wires 21 may be set with the same length.

In the above-described embodiment, the first core wire 33 in the electrical wire 31, 32 is joined to one long side surface 22 of one single-core wire 21, and the second core wire 43 of the electrical wire 41 is joined to the one long side surface 22 of one single-core wire 21. However, the present disclosure is not limited to this configuration. For example, the first core wire 33 may be joined to one long side surface 22 of one single-core wire 21, and the second core wire 43 may be joined to the other long side surface 22. Alternatively, the first core wire 33 of the electrical wire 31 may be joined to one long side surface 22 of one single-core wire 21, and the first core wire 33 of the electrical wire 32 may be joined to the other long side surface 22.

In the above-described embodiment, the first core wires 33 and the second core wires 43 are joined to the long side surfaces 22 of the single-core wires 21, but the present disclosure is not limited to this configuration. For example, the first core wires 33 and the second core wires 43 may be joined to the short side surfaces 23 of the single-core wires 21.

In the above-described embodiment, the arrangement direction of the plurality of single-core wires 21 is not particularly limited. For example, the plurality of single-core wires 21 may be arranged such that the short side surfaces 23 face each other.

In the above-described embodiment, the plurality of electrical wires 31 and 32 are connected to the front end of one single-core wire 21, but the present disclosure is not limited to this configuration.

Figure 9:
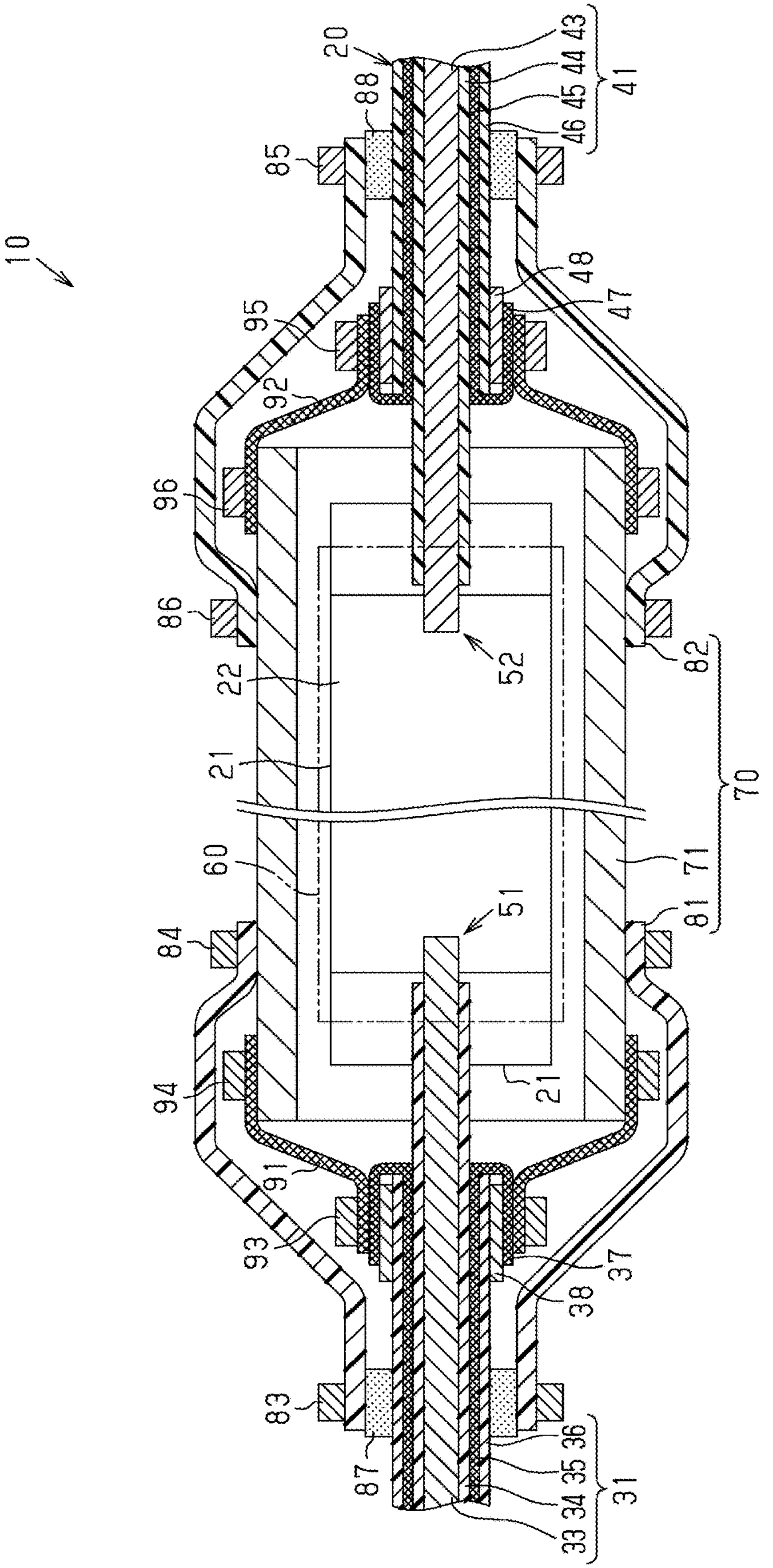
FIG. 9 is a schematic cross-sectional view of a wire harness according to a modification example.

For example, as shown in FIG. 9, only one electrical wire 31 may be connected to the front end of one single-core wire 21. In this case, the first shielding member 91 is electrically connected to the first exposed portion 37 (first individual shielding member 37) of the electrical wire 31.

In the above-described embodiment, the electrical wires 31 and 32 are connected to the front end of the single-core wire 21, and the electrical wires 41 are connected to the rear end of the single-core wire 21. That is, other electrical wires 31, 32, and 41 are connected to both ends of the single-core wire 21 in the length direction. However, the present disclosure is not limited to this configuration. For example, other electrical wires may be connected to only one of both ends of the single-core wire 21 in the length direction.

In the above-described embodiment, the single-core wire 21 is embodied as the conductive member, but the present disclosure is not limited to this. For example, the conductive member may be embodied as a metallic connection terminal provided inside the connector C1 or the like. In this case, the cylindrical member 71 can be embodied as a metallic shield shell included in the connector C1 or the like. Alternatively, the conductive member may be embodied as a non-shielded electrical wire or a shielded electrical wire that does not have an electromagnetic shielding structure itself.

In the above-described embodiment, an insulating coating may be provided to coat the outer periphery of each single-core wire 21. In this case, the coating member 60 is formed so as to coat the outer periphery of the insulating coating that coats the outer periphery of the single-core wire 21, for example. In this case, the coating member 60 does not need to coat the outer periphery of the single-core wire 21 over the entire length of the single-core wire 21 in the length direction, for example.

In the above-described embodiment, the fixing members 83 and 85 may be omitted.

In the above-described embodiment, the waterproof member 81 may be omitted. In this case, the fixing members 83, 84 and the adhesive 87 can be omitted.

In the above-described embodiment, the waterproof member 82 may be omitted. In this case, the fixing members 85, 86 and the adhesive 88 can be omitted.

In the above-described embodiment, the first exposed portions 37 are folded back toward the rear ends of the first sheaths 36. However, the first exposed portions 37 may be changed to a structure in which the first exposed portions 37 are not folded back.

In the above-described embodiment, the second exposed portions 47 are folded back toward the front ends of the second sheaths 46. However, the second exposed portions 47 may be changed to a structure in which the second exposed portions 47 are not folded back.

In the above-described embodiment, the underlay members 38 and 48 may be omitted.

In the above-described embodiment, the second shielding member 92 may be omitted. In this case, the coupling members 95 and 96 can be omitted.

In the above-described embodiment, the first connection parts 51 may be arranged outside of the cylindrical member 71.

In the above-described embodiment, the second connection parts 52 may be arranged outside of the cylindrical member 71.

In the above-described embodiment, two electrical wires, the electrical wire 31 and the electrical wire 32, are connected to the front end of one single-core wire 21, but the present disclosure is not limited to this. For example, three or more electrical wires may be connected to the front end of one single-core wire 21.

In the above-described embodiment, the cylindrical member 71 is embodied as a metal pipe, but the present disclosure is not limited to this. For example, the cylindrical member 71 is not limited to a metal pipe as long as it is a cylindrical shielding member. For example, the cylindrical member 71 may be a member obtained by processing a shielding member such as a braided wire into a cylindrical shape. Alternatively, the cylindrical member 71 may be formed by a corrugated tube and a shielding member such as a braided wire that surrounds the outer periphery of the corrugated tube.

In the above-described embodiment, the electrical wires 41 are embodied as shielded electrical wires, but the present disclosure is not limited to this. For example, the electrical wires 41 may be non-shielded electrical wires.

In the above-described embodiment, the number of electrical wire members 20 constituting the wire harness 10 is not particularly limited. For example, the number of electrical wire members 20 may be three or more.

The embodiments disclosed herein should be considered to be illustrative and not restrictive in all respects. The scope of the present disclosure is not meant by the above description but is indicated by the scope of claims, and is intended to include all modifications within a meaning and scope equivalent to the scope of claims.

The invention claimed is:

1. A wire harness comprising:

a plurality of electrical wire members that each include a first shielded electrical wire having a cylindrical first individual shield and a conductive member electrically connected to the first shielded electrical wire;

a cylinder that surrounds an outer periphery of the conductive members and has electrical conductivity; and a cylindrical first shield that surrounds outer peripheries of portions of the plurality of electrical wire members exposed from the first individual shields and the cylinder and has electrical conductivity, wherein:

each of a plurality of the first shielded electrical wires included in the plurality of electrical wire members includes a first core wire that has electrical conductivity, a first insulating coating that surrounds an outer periphery of the first core wire and has electrical insulation, the first individual shield that surrounds an outer periphery of the first insulating coating and has electrical conductivity, and a first sheath that surrounds an outer periphery of the first individual shield and has electrical insulation, an end of the first individual shield has a first exposed portion that is exposed from an end of the first sheath, and the first shield is electrically connected to the first individual shield in a state of contact with a plurality of the first exposed portions included in the plurality of electrical wire members and is also electrically connected to the cylinder.

2. The wire harness according to claim 1, wherein:

the first shield is provided so as to span across the plurality of first exposed portions and the cylinder in a length direction of the electrical wire members, a first end of the first shield in an axial direction collectively surrounds outer peripheries of the plurality of first exposed portions and is fixed to outer peripheries of the plurality of first shielded electrical wires in a state of contact with the plurality of first exposed portions, and a second end of the first shield in the axial direction surrounds an entire outer periphery of the cylinder in a circumferential direction and is fixed to the outer periphery of the cylinder in a state of contact with the outer periphery of the cylinder.

3. The wire harness according to claim 1, wherein each of the plurality of first exposed portions is structured so as to be folded back toward an end of the first sheath and surrounds an outer periphery of the end of the first sheath.

4. The wire harness according to claim 1, further comprising:

an underlay member that is provided between the outer periphery of the end of the first sheath and the first exposed portions; and a coupler that couples the plurality of first exposed portions and the first shield, wherein:

the underlay member is a metallic ring that is attached to each of the plurality of first shielded wires, and the coupler electrically connects the plurality of first exposed portions and the first shield in a state where the plurality of first exposed portions and the first shield are sandwiched between the underlay member and the coupler.

5. The wire harness according to claim 1, wherein a connection between the plurality of first exposed portions and the first shield has a structure in which the plurality of first exposed portions are bundled so as to be in contact with each other and each of the plurality of first exposed portions is in contact with the first shield.

6. The wire harness according to claim 1, wherein:

the plurality of first shielded electrical wires are three or more first shielded electrical wires, and the three or more first shielded electrical wires are arranged along a first direction that intersects with a length direction of the electrical wire members and a second direction that intersects with the length direction of the electrical wire members and intersects with the first direction.

7. The wire harness according to claim 1, wherein the first individual shield is provided outside of the cylinder in a length direction of the electrical wire members.

8. The wire harness according to claim 1, wherein:

the conductive members are a single-core wire made of a single conductor, the single-core wire is stored in the cylinder, and the first core wire of the first shielded electrical wire and the single-core wire are electrically connected in the cylinder.

9. The wire harness according to claim 8, wherein:

each of the plurality of electrical wire members includes one of the single-core wires, the first shielded electrical wire electrically connected to one end of the one single-core wire in the length direction and a second shielded electrical wire electrically connected to the other end of the one single-core wire in the length direction, each of a plurality of the second shielded electrical wires included in the plurality of electrical wire members includes a second core wire that has electrical conductivity, a second insulating coating that surrounds an outer periphery of the second core wire and has electrical insulation, a second individual shield that surrounds an outer periphery of the second insulating coating and has electrical conductivity, and a second sheath that surrounds an outer periphery of the second individual shield and has electrical insulation, the wire harness further includes a cylindrical second shield that surrounds an outer periphery of portions of the plurality of electrical wire members that are exposed from the second individual shield and the cylinder and has electrical conductivity, an end of the second individual shield has a second exposed portion that is exposed from an end of the second sheath, and the second shield is electrically connected to the second individual shield in a state of contact with a plurality of the second exposed portions included in the plurality of electrical wire members, and is electrically connected to the cylinder.

10. The wire harness according to claim 8, wherein each of the plurality of electrical wire members includes one of the single-core wires and two or more of the first shielded electrical wires electrically connected to one end of the one single-core wire in the length direction.

* * * * *